US012772044B2

(12) United States Patent
Zhang et al.

(10) Patent No.: US 12,772,044 B2
(45) Date of Patent: Oct. 20, 2026

(54) TERMINAL LOCATION CAPABILITY REPORTING METHOD AND DEVICE

(71) Applicant: DATANG MOBILE COMMUNICATIONS EQUIPMENT CO., LTD., Beijing (CN)

(72) Inventors: Bufang Zhang, Beijing (CN); Jianxiang Li, Beijing (CN); Haiyang Quan, Beijing (CN); Jing Fu, Beijing (CN); Yunjing Hou, Beijing (CN); Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 376 days.

(21) Appl. No.: 18/261,486

(22) PCT Filed: Jan. 10, 2022

(86) PCT No.: PCT/CN2022/071104

§ 371 (c)(1),
(2) Date: Jul. 14, 2023

(87) PCT Pub. No.: WO2022/152087

PCT Pub. Date: Jul. 21, 2022

(65) Prior Publication Data

US 2024/0080659 A1 Mar. 7, 2024

(30) Foreign Application Priority Data

Jan. 15, 2021 (CN) ......................... 202110057702.3

(51) Int. Cl.
*H04W 64/00* (2009.01)
*H04W 8/24* (2009.01)

(52) U.S. Cl.
CPC ............. *H04W 8/24* (2013.01); *H04W 64/00* (2013.01)

(58) Field of Classification Search
None
See application file for complete search history.

(56) References Cited

U.S. PATENT DOCUMENTS

2019/0037338 A1* 1/2019 Edge ........................ H04W 4/02
2020/0045666 A1 2/2020 Edge et al.
(Continued)

FOREIGN PATENT DOCUMENTS

CN 110166929 A 8/2019
CN 110366112 A 10/2019
(Continued)

OTHER PUBLICATIONS

CATT, "Further discussion on enhancements for commercial use cases", 3GPP TSG-RAN WG2 #112-e, Online Nov. 2-13, 2020, total 5 pages, R2-2008810.
(Continued)

*Primary Examiner* — Suhail Khan
(74) *Attorney, Agent, or Firm* — KILPATRICK TOWNSEND & STOCKTON LLP

(57) ABSTRACT

The present application discloses a terminal location capability reporting method and device. The method includes the following: an access and mobility management function (AMF) entity obtains and stores a terminal location capability of a terminal, and after a location service for a target terminal arrives, if the terminal location capability of the target terminal is stored in the AMF entity, the AMF entity transmits the terminal location capability of the target terminal to a location management function (LMF) entity.

14 Claims, 10 Drawing Sheets

(56) References Cited

U.S. PATENT DOCUMENTS

| | | | |
|---|---|---|---|
| 2020/0053686 | A1 | 2/2020 | Edge et al. |
| 2020/0322095 | A1 | 10/2020 | Park et al. |

FOREIGN PATENT DOCUMENTS

| | | | |
|---|---|---|---|
| CN | 110881216 | A | 3/2020 |
| CN | 110913472 | A | 3/2020 |
| CN | 110958630 | A | 4/2020 |
| CN | 112203213 | A | 1/2021 |
| WO | 2020092714 | A1 | 5/2020 |
| WO | 2020167615 | A1 | 8/2020 |

OTHER PUBLICATIONS

3GPP TS 23.273 V16.5.0; 3rd Generation Partnership Project; Technical Specification Group Services and System Aspects;5G System (SGS) Location Services (LCS);Stage 2 (Release 16) total 97 pages.

Huawei et al., "Update of Solution 4 "Positioning operations considering different LMF deployment scenarios, SA WG2 Meeting #127bis, May 28-Jun. 1, 2018 Newport Beach, California, USA, total 8 pages, S2-185284.

* cited by examiner

TERMINAL LOCATION CAPABILITY REPORTING METHOD AND DEVICE

CROSS REFERENCE TO RELATED APPLICATIONS

The present application is a US National Stage of International Application No. PCT/CN2022/071104, filed on Jan. 10, 2022, which claims the priority of the Chinese patent application No. 202110057702.3 filed to the China Patent Office on Jan. 15, 2021, and entitled "REPORTING METHOD AND DEVICE of TERMINAL LOCATION CAPABILITY", of which the entire contents are incorporated herein by reference.

FIELD

The present application relates to the field of wireless communications, in particular to a reporting method and device of a terminal location capability.

BACKGROUND

A location technology is a service technology that acquires position information of a terminal through a wireless communication network or other location systems, and then combines with a geographic information system to provide various types of position-related information for the terminal. For example, an outdoor location technology based on a global navigation satellite system (GNSS) has been widely applied in various fields. With development of wireless communication, a high-precision location technology based on a fourth generation (4G) mobile communication network has effectively filled a gap in satellite navigation system location.

At present, the mobile communication network has entered an era of a fifth generation (5G) mobile communication technology. Compared to a 4G location network architecture, a 5G location network architecture has higher precision and lower latency location requirements.

However, in an existing location service processing process, a location management function (LMF) entity needs to first acquire a location-related terminal location capability from the terminal, and then allocate an appropriate location method and perform measurement configuration for the terminal based on the terminal location capability. A location delay is introduced in a process that the LMF entity acquires the terminal location capability from the terminal.

SUMMARY

Embodiments of the present application provide a terminal location capability reporting method and device, to reduce a delay in a location service processing process.

In one embodiment of the present application provides a reporting method of a terminal location capability, applied to an access and mobility management function (AMF) entity, and including: acquiring and storing a terminal location capability of a terminal; and sending, after a location service for a target terminal arrives and in a case that a terminal location capability of the target terminal is stored in the AMF entity, the terminal location capability of the target terminal to an LMF entity, and the LMF sets a location method for the target terminal according to the terminal location capability; where the LMF entity is an LMF entity selected by the AMF entity for the target terminal.

In one embodiment, the acquiring and storing, by the AMF entity, the terminal location capability of the terminal includes: acquiring and storing, by the AMF entity, the terminal location capability of the terminal from the terminal; or acquiring and storing, by the AMF entity, the terminal location capability of the target terminal from the LMF entity; or acquiring and storing, by the AMF entity, the terminal location capability of the target terminal from a serving base station of the target terminal.

In one embodiment, the acquiring and storing, by the AMF entity, the terminal location capability of the terminal from the terminal includes: before the location service for the target terminal arrives, receiving, by the AMF entity, a non-access stratum (NAS) message sent by the terminal, where the NAS message carries a container containing the terminal location capability; and storing, by the AMF entity, the container containing the terminal location capability carried in the NAS message to a terminal context of the terminal.

In one embodiment, the NAS message is an attach request message sent by the terminal after the terminal first accesses to a network; or, the NAS message is a tracking area update (TAU) request message sent by the terminal after the terminal location capability of the terminal is updated.

In one embodiment, the acquiring and storing, by the AMF entity, the terminal location capability of the target terminal from the LMF entity includes: sending, by the AMF entity after the location service for the target terminal arrives and in a case that the terminal location capability of the target terminal is not stored in the AMF entity, a location request to the LMF entity, where the location request carries indication information to indicate that the terminal location capability of the target terminal is not stored in the AMF entity; or, notifying, by the AMF entity in a case that the terminal location capability of the target terminal is not stored in the AMF entity, the LMF entity to establish a location service session and then sending a first indication message to the LMF entity to indicate that the terminal location capability of the target terminal is not stored in the AMF entity; or, sending, by the AMF entity in a case that the AMF entity receives a first capability request message sent by the LMF entity and the terminal location capability of the target terminal is not stored in the AMF entity, a first capability request response message to the LMF entity, where the first capability request message indicates acquisition of the terminal location capability of the target terminal, and the first capability request response message indicates that the terminal location capability of the target terminal is not stored in the AMF entity; and receiving, by the AMF entity, the container containing the terminal location capability of the target terminal sent by the LMF entity, and storing the container containing the terminal location capability of the target terminal in the terminal context of the terminal.

In one embodiment, the acquiring and storing, by the AMF entity, the terminal location capability of the terminal from the serving base station of the target terminal includes: sending, by the AMF entity after the location service for the target terminal arrives and in a case that the terminal location capability of the target terminal is not stored in the AMF entity, an NG interface request message to the serving base station of the target terminal, where the NG interface request message is for indicating the base station to acquire the terminal location capability of the target terminal; and receiving, by the AMF entity, the NG interface message returned by the base station, and storing the container containing the terminal location capability of the target terminal carried in the NG interface message to the terminal context of the target terminal.

In one embodiment, the sending, by the AMF entity, the terminal location capability of the target terminal to the LMF entity includes: sending, by the AMF entity, a location request for the target terminal to the LMF entity, where the location request carries the container containing the terminal location capability of the target terminal; or sending, by the AMF entity after notifying the LMF entity to establish a location service session, a second indication message to the LMF entity, where the second indication message carries the container containing the terminal location capability of the target terminal.

In one embodiment, before sending, by the AMF entity, the terminal location capability of the target terminal to the LMF entity, the method further includes: receiving, by the AMF entity, a first capability request message sent by the LMF entity, where the first capability request message indicates acquisition of the terminal location capability of the target terminal; where the sending, by the AMF entity, the terminal location capability of the target terminal to the LMF entity includes: sending, by the AMF entity, a second capability request response message carrying the container containing the terminal location capability of the target terminal to the LMF entity according to the first capability request message.

In one embodiment of the present application provides a reporting method of a terminal location capability, applied to a terminal, and including: reporting a terminal location capability of the terminal to an AMF entity; or, reporting the terminal location capability of the terminal to an LMF entity; or, reporting the terminal location capability of the terminal to a serving base station of the terminal.

In one embodiment, the reporting, by the terminal, the terminal location capability of the terminal to the AMF entity includes: adding, by the terminal, the terminal location capability to a container and adding the container containing the terminal location capability to an NAS message; and reporting, by the terminal, the NAS message carrying the container containing the terminal location capability to the AMF entity.

In one embodiment, the NAS message is an attach request message; or, the NAS message is a TAU request message.

In one embodiment, the reporting, by the terminal, the terminal location capability of the terminal to the LMF entity includes:

reporting, in a case that the terminal receives a long term evolution positioning protocol (LPP) location capability request message sent by the LMF entity, the terminal location capability to the LMF entity according to the LPP location capability request message.

In one embodiment, the reporting, by the terminal, the terminal location capability of the terminal to the serving base station of the terminal includes: reporting, by the terminal in a case that the terminal receives a third capability request message sent by the serving base station of the terminal, the terminal location capability of the terminal to the base station according to the third capability request message.

In one embodiment of the present application provides a reporting method of a terminal location capability, applied to an LMF entity, and including: acquiring a terminal location capability of a target terminal from an AMF entity; or acquiring the terminal location capability of the target terminal from the target terminal and/or a serving base station of the target terminal, and transferring the acquired terminal location capability of the target terminal to the AMF entity; and setting a location method for the target terminal according to the terminal location capability.

In one embodiment, the acquiring, by the LMF entity, the terminal location capability of the target terminal from the AMF entity includes: receiving, by the LMF entity after a location service for the target terminal arrives, a location request for the target terminal sent by the AMF entity, where the location request carries a container containing the terminal location capability of the target terminal; or receiving, by the LMF entity after the LMF entity establishes a location service session, a second indication message sent by the AMF entity, where the second indication message carries the container containing the terminal location capability of the target terminal.

In one embodiment, before acquiring, by the LMF entity, the terminal location capability of the target terminal from the AMF entity, the method further includes: sending, by the LMF entity, a first capability request message to the AMF entity, where the first capability request message indicates acquisition of the terminal location capability of the target terminal; where the acquiring, by the LMF entity, the terminal location capability of the target terminal from the AMF entity includes: receiving, by the LMF entity, a second capability request response message carrying the container containing the terminal location capability of the target terminal sent by the AMF entity.

In one embodiment, before acquiring, by the LMF entity, the terminal location capability of the target terminal from the target terminal and/or the serving base station of the target terminal, the method further includes: receiving, by the LMF entity, a location request sent by the AMF entity, where the location request carries indication information for indicating that the terminal location capability of the target terminal is not stored in the AMF entity; or receiving, by the LMF entity, a first indication message sent by the AMF entity after the AMF entity notifies the LMF entity to establish a location service session, where the first indication message indicates that the terminal location capability of the target terminal is not stored in the AMF entity; or receiving, by the LMF entity, a first capability request response message sent by the AMF entity, where the first capability request response message is a response message of the AMF entity for the first capability request message sent by the LMF entity, and the first capability request message indicates that the terminal location capability of the target terminal is not stored in the AMF entity.

In one embodiment, the acquiring, by the LMF entity, the terminal location capability of the target terminal from the target terminal and/or the serving base station of the target terminal, includes: sending, by the LMF entity, an LPP request message to the target terminal, and receiving, by the LMF entity, the terminal location capability sent by the target terminal; or, sending, by the LMF entity, an NRPPa request message to the serving base station of the target terminal, where the NRPPa request message is for indicating the serving base station of the target terminal to acquire the terminal location capability of the target terminal; and receiving, by the LMF entity, the NRPPa message returned by the serving base station of the target terminal, where the NRPPa message carries the terminal location capability of the target terminal.

In one embodiment of the present application provides a reporting method of a terminal location capability, applied to a base station, and including: receiving a capability acquiring message sent by an AMF entity or an LMF entity; acquiring a terminal location capability of a target terminal from the target terminal; and reporting the terminal location capability of the target terminal to the AMF entity or the LMF entity.

In one embodiment, the receiving, by the base station, the capability acquiring message sent by the AMF entity or the LMF entity includes: receiving, by the base station, an NG interface request message sent by the AMF entity, where the NG interface request message is for indicating the base station to acquire the terminal location capability of the target terminal; and receiving, by the base station, an NRPPa message sent by the LMF entity, where the NRPPa request message is for indicating the base station to acquire the terminal location capability of the target terminal.

In one embodiment, the reporting, by the base station, the terminal location capability of the target terminal to the AMF entity or the LMF entity includes: reporting, by the base station, a container containing the terminal location capability of the target terminal to the AMF entity through an NG interface message; or reporting, by the base station, the container containing the terminal location capability of the target terminal to the LMF entity through an NRPPa message.

In one embodiment, the acquiring, by the base station, the terminal location capability of the target terminal from the target terminal includes: sending, by the base station, a third capability request message to the target terminal to request to acquire the terminal location capability of the target terminal; and receiving, by the base station, the terminal location capability of the target terminal returned by the target terminal.

In one embodiment of the present application provides an AMF entity, including: an acquiring device and a transmitting device, where the acquiring device is configured to acquire and store a terminal location capability of a terminal; and the transmitting device is configured to send, after a location service for a target terminal arrives and in a case that a terminal location capability of the target terminal is stored, the terminal location capability of the target terminal to an LMF entity, and the LMF sets a location method for the target terminal according to the terminal location capability, where the LMF entity is an LMF entity selected by the AMF entity for the target terminal.

In one embodiment of the present application provides a terminal, including a reporting device, where the reporting device is configured to: report a terminal location capability of the terminal to an AMF entity; or, report the terminal location capability of the terminal to an LMF entity; or, report the terminal location capability of the terminal to a serving base station of the terminal.

In one embodiment of the present application provides an LMF entity, including: an acquiring device and a setting device, where the acquiring device is configured to acquire a terminal location capability of a target terminal from an AMF entity; or acquire the terminal location capability of the target terminal from the target terminal and/or a serving base station of the target terminal, and transfer the acquired terminal location capability of the target terminal to the AMF entity; and the setting device is configured to set a location method for the target terminal according to the terminal location capability.

In one embodiment of the present application provides a base station, including: a receiving device, an acquiring device and a reporting device, where the receiving device is configured to receive a capability acquiring message sent by an AMF entity or an LMF entity; the acquiring device is configured to acquire a terminal location capability of a target terminal from the target terminal; and the reporting device is configured to report the terminal location capability of the target terminal to the AMF entity or the LMF entity.

In one embodiment of the present application provides an AMF entity, including: a memory, a transceiver and a processor, where the memory is configured to store computer instructions; the transceiver is configured to receive and send data under control of the processor; and the processor is configured to read a computer program in the memory and execute the any one method in the embodiments.

In one embodiment of the present application provides a terminal, including: a memory, a transceiver and a processor, where the memory is configured to store computer instructions; the transceiver is configured to receive and send data under control of the processor; and the processor is configured to read a computer program in the memory and execute the any one method in the embodiments.

In one embodiment of the present application provides an LMF entity, including: a memory, a transceiver and a processor, where the memory is configured to store computer instructions; the transceiver is configured to receive and send data under control of the processor; and the processor is configured to read a computer program in the memory and execute the any one method in the embodiments.

In one embodiment of the present application provides a base station, including: a memory, a transceiver and a processor, where the memory is configured to store computer instructions; the transceiver is configured to receive and send data under control of the processor; and the processor is configured to read a computer program in the memory and execute the any one method in the embodiments.

In one embodiment of the present application provides a computer readable storage medium. The storage medium stores computer instructions, and the computer instructions, when executed by a processor, implement the any one method in the embodiments.

In one embodiment of the present application provides a computer readable storage medium. The storage medium stores computer instructions, and the computer instructions, when executed by a processor, implement the any one method in the embodiments.

In one embodiment of the present application provides a computer readable storage medium. The storage medium stores computer instructions, and the computer instructions, when executed by a processor, implement the any one method in the embodiments.

In one embodiment of the present application provides a computer program product. Instructions in the computer program product, when executed by a processor of an electronic device, cause the processor to execute the any one method in the embodiments.

In the above embodiments of the present application, the AMF entity acquires and stores the terminal location capability of the terminal, and after the location service for the target terminal arrives, in a case that the terminal location capability of the target terminal is stored in the AMF entity, the AMF entity sends the terminal location capability of the target terminal to the LMF entity, and the LMF sets the location method for the target terminal according to the terminal location capability. In the above process, when the LMF entity needs to acquire the terminal location capability of the target terminal, the terminal location capability of the target terminal may be directly acquired from the AMF entity, and there is no need to interact with the terminal to acquire the terminal location capability. Therefore, location delay introduced by the LMF when the LMF acquires the terminal location capability in a location service processing process can be remarkably reduced.

DETAILED DESCRIPTION

One embodiment of the present application is illustrated in detail below with reference to accompanying drawings. It should be understood that the embodiments described here is only used for illustrating and explaining the present application and not for limiting the present application.

It should be noted that terms "first" and "second" in the embodiments of the present application are used for distinguishing similar objects, and are not necessarily used for describing a specific order or a precedence order.

Figure 1:
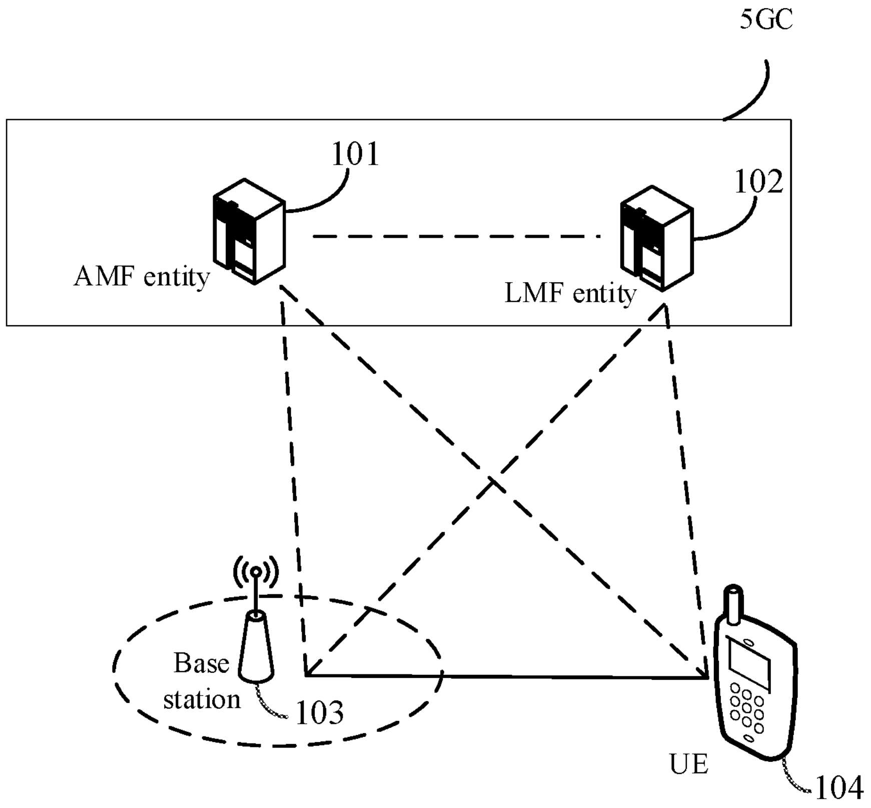
FIG. 1 is a schematic structural diagram of a communication system applicable to an embodiment of the present application.
Figure 2:
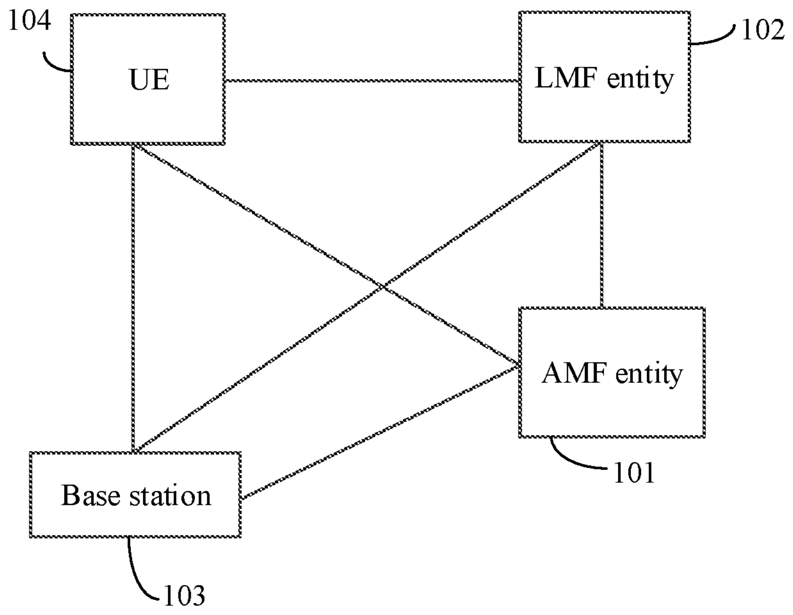
FIG. 2 is a structural block diagram of a communication system applicable to an embodiment of the present application.

FIG. 1 is a schematic structural diagram of a communication system applicable to an embodiment of the present application. FIG. 2 is a structural block diagram of the communication system applicable to the embodiment of the present application. The communication system may be a 5G communication system, as shown in FIG. 1 and FIG. 2, the 5G communication system includes a 5G core (5GC), a base station 103 and user equipment 104. The user equipment 104 is hereinafter referred to as a terminal. Network elements that constitute the 5G core include an AMF entity 101 for providing control plane functions such as access and mobility management, and an LMF entity 102 for providing a location service.

As a radio access network (RAN) node, the base station 103 may include a gNB that provides wireless network user plane and control plane protocols and functions for a user of a 5G network, or an eNB that provides wireless network user plane and control plane protocols and functions for a user of a 4G network.

The user equipment 104 may be a terminal device that provides voice and/or data connectivity to the user, a handheld device with a wireless connection function, or other processing devices connected to a wireless modem. In different systems, names of the user equipment 104 may also be different. For example, in the 5G system, the terminal device may be called user equipment (UE). The user equipment 104 may communicate with one or more cores via a radio access network.

It should be noted that in the following description, the AMF entity is abbreviated as AMF and the LMF entity is abbreviated as LMF.

In practical applications, the user equipment 104 and the base station 103 in the access network may establish an RRC connection through a radio resource control (RRC) protocol to achieve transmission of terminal wireless access performance information, acquisition of system information, acquisition of wireless resources, mobility management, etc.

The RRC connection state of the user equipment 104 may include: an RRC_CONNECTED state, an RRC_IDLE state, and an RRC_INACTIVE state. The RRC_CONNECTED state is that the terminal establishes an RRC connection with the base station. The RRC_IDLE state is that the terminal does not establish the RRC connection with the base station. The RRC_INACTIVE state is that the RRC connection between the terminal and the base station is not activated.

When the user equipment 104 is in the RRC_INACTIVE state, the terminal is still kept in a connection management-CONNECTED (CM-CONNECTED) state, and the terminal may switch RAN nodes within an RAN notification area (RNA) where a serving base station is located without notifying the AMF. When the user equipment 104 is in the RRC_INACTIVE state, the last base station that serves the terminal retains contextual information of the terminal and a next generation (NG) interface connection between the terminal and the AMF.

It should be noted that the above architecture is described by taking a 5G system architecture as an example. The embodiments of the present application may also be applicable to a 5G evolution system, or applicable to other communication systems (such as a 4G communication system), or applicable to a system architecture for hybrid networking between the 5G system and other communication systems (such as the 4G system), which is not listed one by one here.

Based on the above system structure, the LMF in the core provides the location service for the terminal in collaboration with the AMF.

In an existing release 16 (R16) location technology, in a location service processing process, the LMF entity needs to first acquire a location-related terminal location capability from the terminal, and then allocate an appropriate location method and perform measurement configuration for the terminal based on the terminal location capability. That is to say, after establishing a location service session, the LMF entity needs to interact with the terminal to acquire the terminal location capability of the terminal. In the location service processing process, location delay may be introduced in the above interaction process between the LMF entity and the terminal.

Based on this, embodiments of the present application provide a reporting method and device of a terminal location capability, an AMF acquires and stores a terminal location capability of a terminal; after a location service for a target terminal arrives, the AMF entity may transmit the terminal location capability of the target terminal to an LMF in a case that a terminal location capability of the target terminal is stored in the AMF, and the LMF sets a location method for the target terminal according to the terminal location capability, and there is no need to interact with the terminal to acquire the terminal location capability. Therefore, location delay introduced by the LMF when the LMF acquires the terminal location capability in a location service processing process can be remarkably reduced.

The following provides a detailed explanation of the reporting method and device of a terminal location capability provided by the present application through some embodiments.

Figure 3:
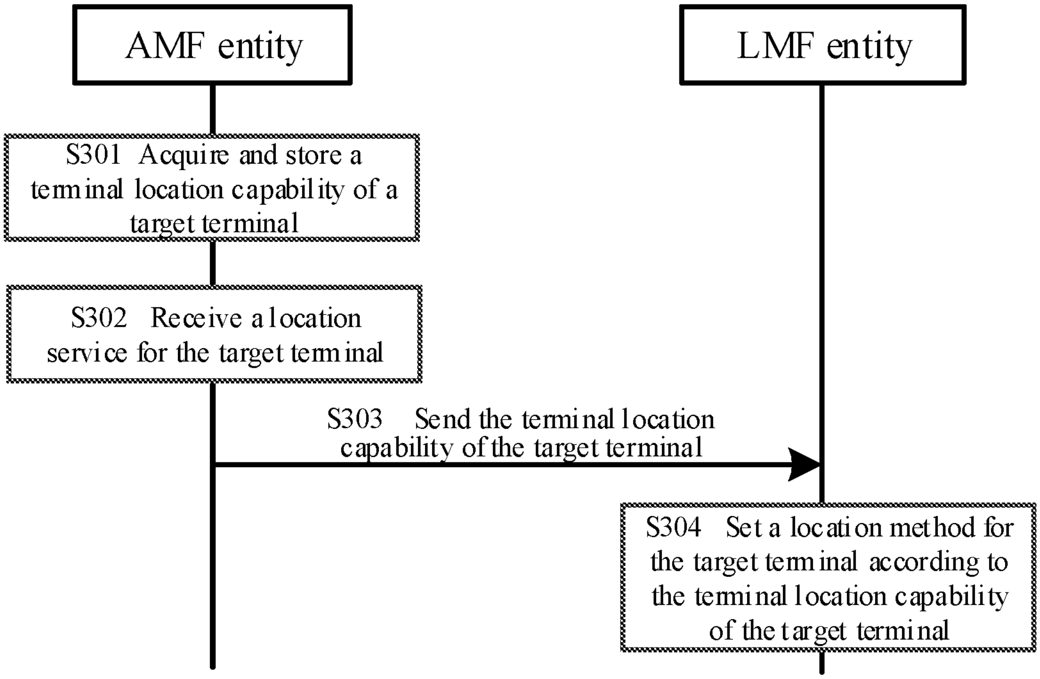
FIG. 3 is an interactive flowchart of a reporting method of a terminal location capability provided by an embodiment of the present application.

FIG. 3 is a signaling interaction diagram of a reporting method of a terminal location capability provided by an embodiment of the present application. As shown in FIG. 3, the process may include the following steps.

S301, an AMF acquires and stores a terminal location capability of a target terminal.

In some embodiments, the AMF acquires the terminal location capability of the target terminal from the target terminal. Before a location service for the target terminal arrives, the target terminal sends a container containing the terminal location capability to the AMF through a non-access stratum (NAS) message.

In one embodiment, in an embodiment, the NAS message is an attach request message. After the target terminal first accesses to a network, the target terminal sends the container containing the terminal location capability to the AMF through the attach request message.

In another embodiment, the NAS message is a tracking area update (TAU) request message. When the terminal location capability of the target terminal is changed or updated, the target terminal initiates a TAU update process and sends the container containing the updated terminal location capability to the AMF through the TAU request message.

After receiving the NAS message sent by the target terminal, the AMF stores the container containing the terminal location capability of the target terminal carried in the NAS message to a corresponding terminal context in the AMF.

In some other embodiments, the AMF further acquires the terminal location capability of the target terminal through a serving base station of the target terminal or an LMF.

S302, the AMF receives the location service for the target terminal.

S303, the AMF sends the terminal location capability of the target terminal to the LMF.

The location service of the above target terminal may be a location capability request initiated by the target terminal for itself, or a location capability request initiated by an external server for the target terminal.

The AMF receives the location service for the target terminal, selects the corresponding LMF for the target terminal, and sends the terminal location capability of the target terminal to the selected LMF.

In one embodiment, in a case that the container containing the terminal location capability of the target terminal is stored in the AMF, the AMF may actively report the container containing the terminal location capability of the target terminal to the LMF selected for the target terminal, and the LMF sets a location method for the target terminal according to the terminal location capability of the target terminal.

In an embodiment, the AMF sends a location request for the target terminal to the selected LMF, and the location request carries the container containing the terminal location capability of the target terminal.

In another embodiment, after selecting the LMF for the target terminal, the AMF notifies the LMF to establish a location service session, and then sends a second indication message to the LMF; and the second indication message carries the container containing the terminal location capability of the target terminal.

S304, the LMF sets the location method for the target terminal according to the terminal location capability of the target terminal.

In the above embodiments, after the location service for the target terminal arrives, the AMF entity sends the terminal location capability of the target terminal to the LMF in a case that the terminal location capability of the target terminal is stored in the AMF, and the LMF sets the location method for the target terminal according to the terminal location capability, and there is no need to interact with the terminal to acquire the terminal location capability. Therefore, location delay introduced by the LMF when the LMF acquires the terminal location capability in the location service processing process can be remarkably reduced.

In one embodiment, since each LMF has a given influence area, when the target terminal is within an influence area of a given LMF, the LMF may provide a location service for the target terminal. When the target terminal leaves the influence area of the LMF, the LMF cannot continue to provide the location service for the target terminal, and the AMF needs to select a new LMF to provide the location service for the target terminal. In a case that the terminal location capability of the target terminal is stored in the AMF, the terminal location capability of the target terminal may be directly sent to the new LMF to avoid a situation that the new LMF still needs to interact with the target terminal to reacquire the terminal location capability after reselecting the new LMF for the target terminal.

In addition, in an R17 location technology, it is expected that the terminal may be located in both the IDLE state and INACTIVE state. To achieve the location requirement, how to report the terminal location capability is also a key needing to be considered.

In the above embodiments, when the terminal first accesses to the network or the terminal location capability is changed or updated, the terminal location capability is reported to the AMF through the NAS message for storing, to support location in the IDLE state and INACTIVE state.

Figure 4:
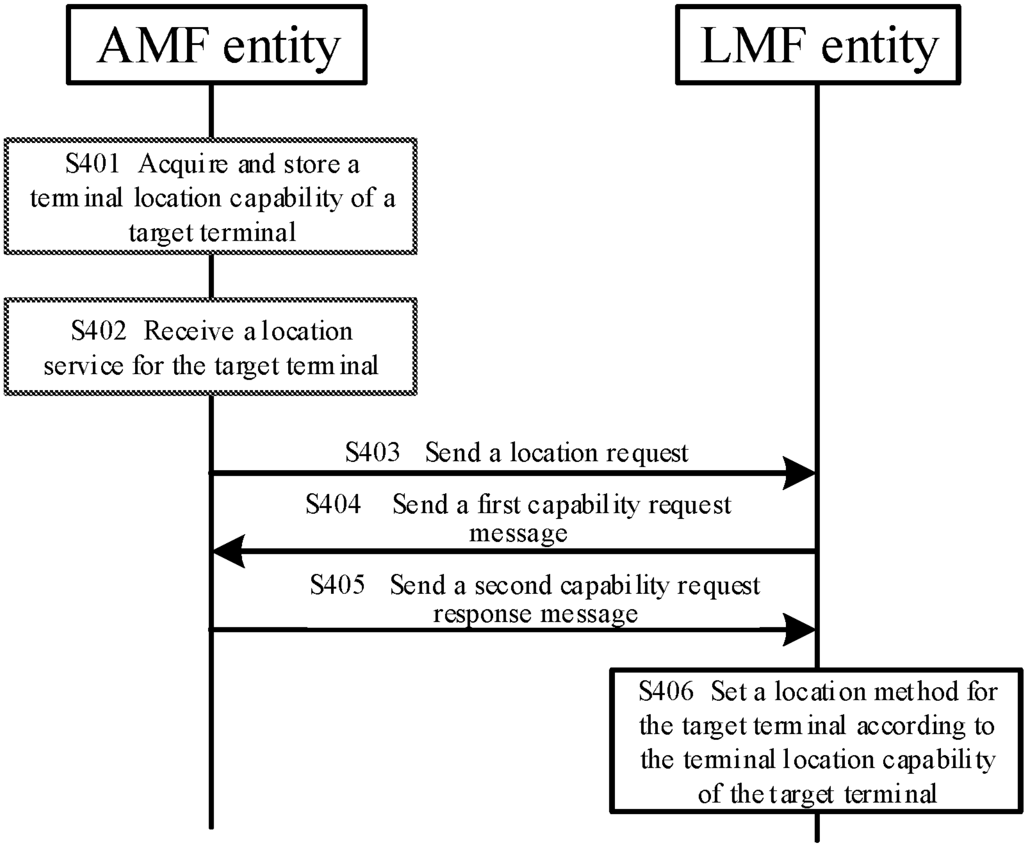
FIG. 4 is an interactive flowchart of another reporting method of a terminal location capability provided by an embodiment of the present application.

FIG. 4 is a signaling interaction diagram of another reporting method of the terminal location capability provided by embodiments of the present application. As shown in FIG. 4, the process may include the following steps.

Step S401, an AMF acquires and stores a terminal location capability of a target terminal.

Step S402, the AMF receives a location service for the target terminal.

Step S403, the AMF sends a location request to the LMF.

The AMF receives the location service for the target terminal, selects the corresponding LMF for the target terminal, and sends the location request to the selected LMF; and the location request is for notifying the selected LMF to establish a location service session.

Step S404, the LMF sends a first capability request message to the AMF.

After establishing the location service session according to notification of the AMF, the LMF sends the first capability request message to the AMF; and the first capability request message indicates acquisition of the terminal location capability of the target terminal.

Step S405, the AMF sends a second capability request response message to the LMF.

After the AMF receives the first capability request message sent by the LMF, in a case that the container containing the terminal location capability of the target terminal is stored in the AMF, the AMF sends the second capability request response message carrying the container containing the terminal location capability of the target terminal to the LMF according to the first capability request message, and the LMF sets a location method for the target terminal according to the terminal location capability of the target terminal.

Step S406, the LMF sets the location method for the target terminal according to the terminal location capability of the target terminal.

Figure 5:
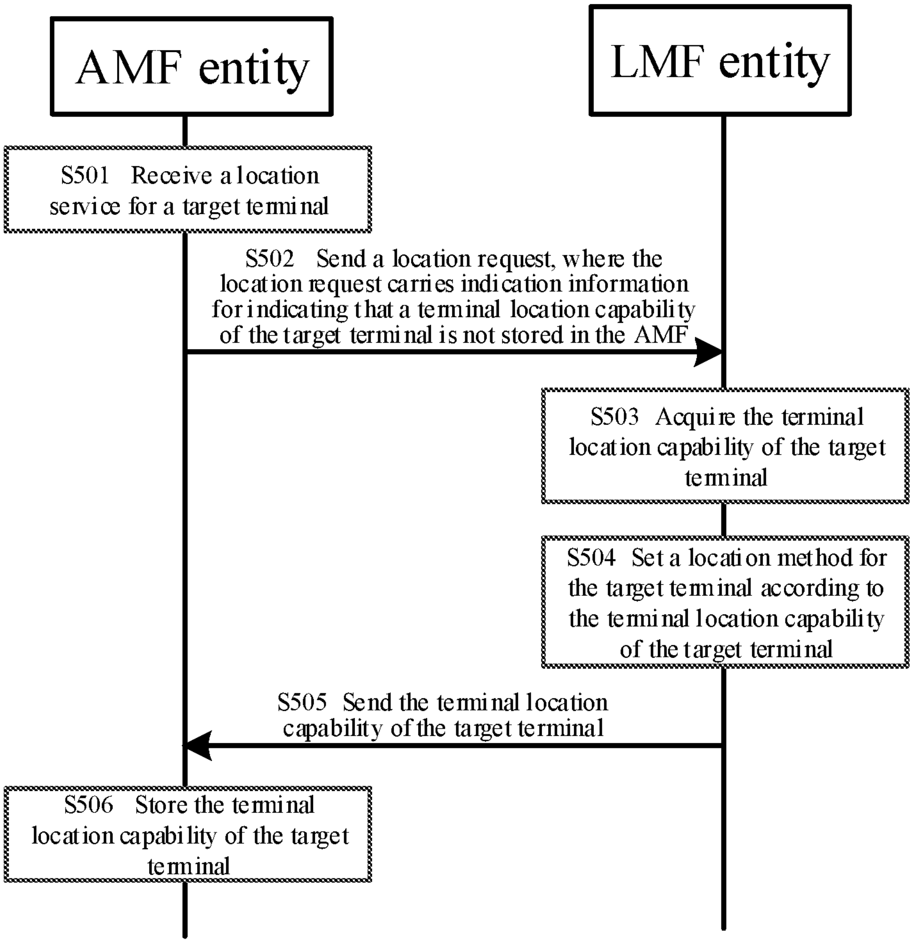
FIG. 5 is an interactive flowchart of another reporting method of a terminal location capability provided by an embodiment of the present application.

FIG. 5 is a signaling interaction diagram of another reporting method of the terminal location capability provided by embodiments of the present application. As shown in FIG. 5, the process may include the following steps.

S501, an AMF receives a location service for a target terminal.

S502, the AMF sends a location request to an LMF, where the location request carries indication information for indicating that a terminal location capability of the target terminal is not stored in the AMF.

The AMF receives the location service for the target terminal and determines whether a container containing the terminal location capability of the target terminal is stored. In a case that the container containing the terminal location capability of the target terminal is stored in the AMF, the terminal location capability of the target terminal is sent to the LMF according to the method shown in FIG. 3. In a case that the container containing the terminal location capability of the target terminal is not stored in the AMF, the AMF sends the location request to the LMF, where the location request carries the indication information for indicating that the terminal location capability of the target terminal is not stored in the AMF.

S503, the LMF acquires the terminal location capability of the target terminal.

In an embodiment, after receiving the location request sent by the AMF, the LMF sends a long term evolution positioning protocol (LPP) request message to the target terminal according to the location request, where the LPP request message is for acquiring the terminal location capability of the target terminal. After receiving the LPP request message sent by the LMF, the target terminal sends the container containing the terminal location capability to the LMF.

In another embodiment, after receiving the location request sent by the AMF, the LMF sends a new radio positioning protocol annex (NRPPa) request message to a serving base station of the target terminal according to the location request, where the NRPPa request message is for acquiring the terminal location capability of the target terminal. After receiving the NRPPa request message sent by the LMF, in a case that the terminal location capability of the target terminal for the NRPPa request message is not stored, the base station sends a third capability request message to the target terminal, where the third capability request message is for acquiring the terminal location capability of the target terminal.

After receiving the third capability request message sent by the base station, the target terminal sends the container containing the terminal location capability to the base station according to the third capability request message. After receiving the container containing the terminal location capability and sent by the target terminal, the base station sends the NRPPa message to the LMF, where the NRPPa message carries the container containing the terminal location capability of the target terminal.

In some embodiments, after receiving the NRPPa request message sent by the LMF, in a case that the terminal location capability of the target terminal for the NRPPa request message is stored, the base station directly sends the stored container containing the terminal location capability of the target terminal to the LMF through the NRPPa message.

S504, the LMF sets a location method for the target terminal according to the terminal location capability of the target terminal.

After receiving the terminal location capability of the target terminal sent by the target terminal or the serving base station of the target terminal, the LMF sets the location method for the target terminal according to the terminal location capability of the target terminal.

S505, the LMF sends the terminal location capability of the target terminal to the AMF.

S506, the AMF stores the terminal location capability of the target terminal.

After receiving the terminal location capability of the target terminal sent by the target terminal or the serving base station of the target terminal, the LMF sends the container containing the terminal location capability of the target terminal to the AMF, and the AMF stores the received container containing the terminal location capability of the target terminal in a corresponding terminal context.

Figure 6:
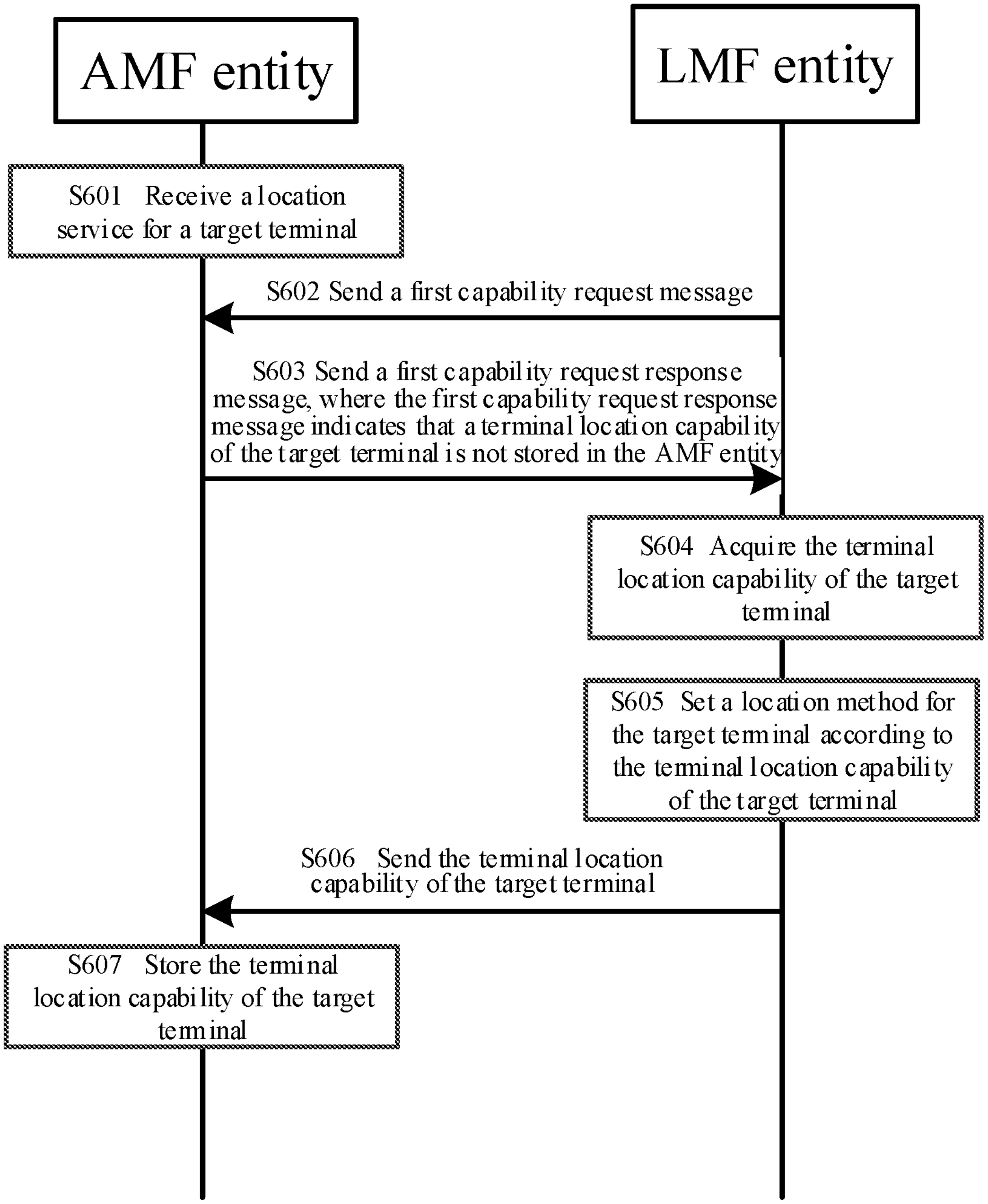
FIG. 6 is an interactive flowchart of another reporting method of a terminal location capability provided by an embodiment of the present application.

FIG. 6 is a signaling interaction diagram of another reporting method of the terminal location capability provided by embodiments of the present application. As shown in FIG. 6, the process may include the following steps.

S601, an AMF receives a location service for a target terminal.

S602, an LMF sends a first capability request message to the AMF.

After the AMF receives the location service for the target terminal, the LMF sends the first capability request message to the AMF, where the first capability request message indicates acquisition of the terminal location capability of the target terminal.

S603, the AMF sends a first capability request response message to the LMF, where the first capability request response message indicates that the terminal location capability of the target terminal is not stored in the AMF entity.

After receiving the first capability request message sent by the LMF, the AMF needs to determine whether a container containing the terminal location capability of the target terminal is stored. In a case that the container containing the terminal location capability of the target terminal is stored in the AMF, a second capability request response message carrying the container containing the terminal location capability of the target terminal is sent to the LMF according to the method shown in FIG. 4. In a case that the container containing the terminal location capability of the target terminal is not stored in the AMF, the AMF sends the first capability request response message to the LMF, where the first capability request response message indicates that the terminal location capability of the target terminal is not stored in the AMF entity.

S604, the LMF acquires the terminal location capability of the target terminal.

In an embodiment, after receiving the first capability request response message sent by the AMF, the LMF sends an LPP request message to the target terminal according to the first capability request response message, where the LPP request message is for acquiring the terminal location capability of the target terminal. After receiving the LPP request message sent by the LMF, the target terminal sends the container containing the terminal location capability to the LMF.

In another embodiment, after receiving the first capability request response message sent by the AMF, the LMF sends an NRPPa request message to a serving base station of the target terminal according to the first capability request response message, where the NRPPa request message is for acquiring the terminal location capability of the target terminal. After receiving the NRPPa request message sent by the LMF, in a case that the terminal location capability of the target terminal for the NRPPa request message is not stored, the base station sends a third capability request message to the target terminal, where the third capability request message is for acquiring the terminal location capability of the target terminal.

After receiving the third capability request message sent by the base station, the target terminal sends the container containing the terminal location capability to the base station according to the third capability request message. After receiving the container containing the terminal location capability sent by the target terminal, the base station sends the NRPPa message to the LMF, where the NRPPa message carries the container containing the terminal location capability of the target terminal.

S605, the LMF sets a location method for the target terminal according to the terminal location capability of the target terminal.

After receiving the terminal location capability of the target terminal sent by the target terminal or the serving base station of the target terminal, the LMF sets the location method for the target terminal according to the terminal location capability of the target terminal.

S606, the LMF sends the terminal location capability of the target terminal to the AMF.

S607, the AMF stores the terminal location capability of the target terminal.

After receiving the terminal location capability of the target terminal sent by the target terminal or the serving base station of the target terminal, the LMF sends the container containing the terminal location capability of the target terminal to the AMF, and the AMF stores the received container containing the terminal location capability of the target terminal in a corresponding terminal context.

Figure 7:
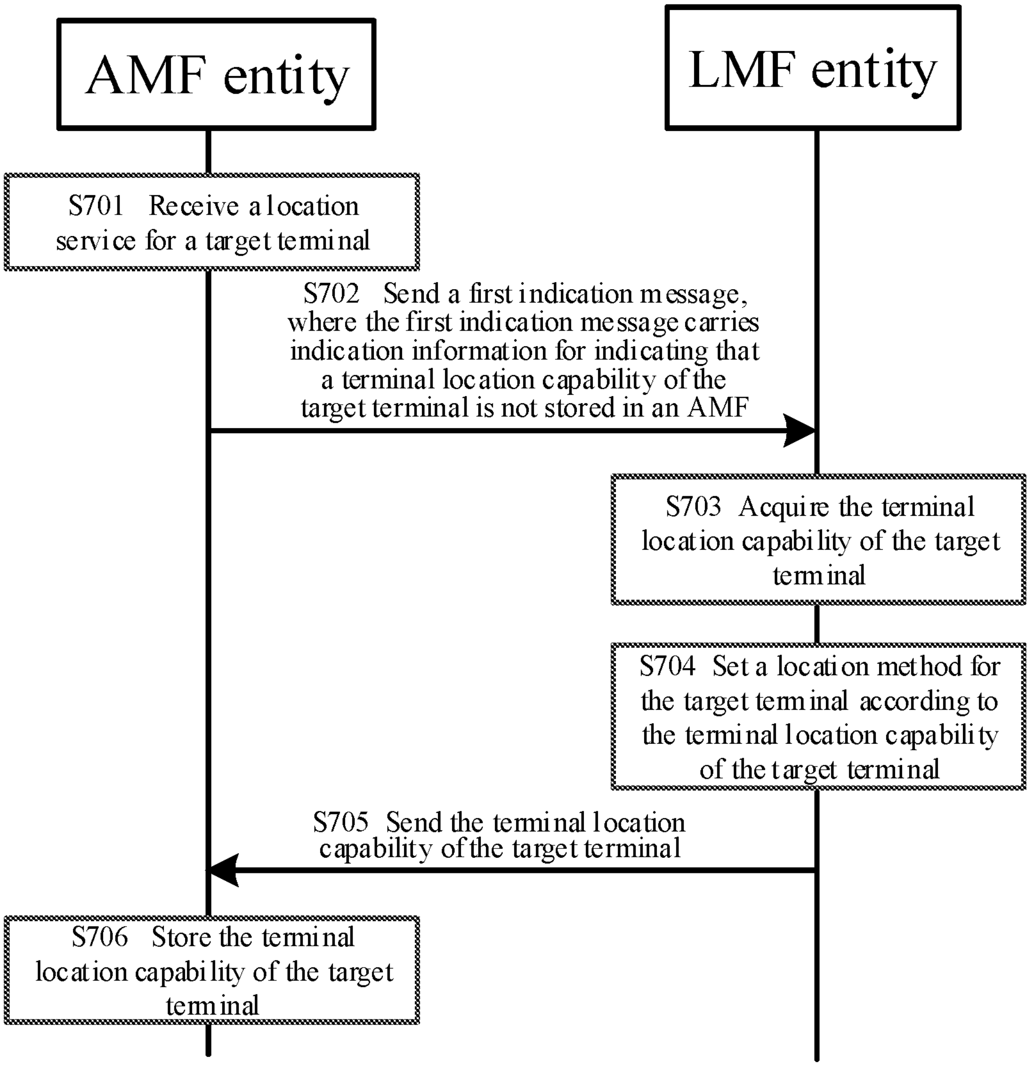
FIG. 7 is an interactive flowchart of another reporting method of a terminal location capability provided by an embodiment of the present application.

FIG. 7 is a signaling interaction diagram of another reporting method of the terminal location capability provided by embodiments of the present application. As shown in FIG. 7, the process may include the following steps.

S701, an AMF receives a location service for a target terminal.

S702, the AMF sends a first indication message to an LMF, where the first indication message carries indication information for indicating that a terminal location capability of the target terminal is not stored in the AMF.

The AMF receives the location service for the target terminal and determines whether a container containing the terminal location capability of the target terminal is stored. In a case that the container containing the terminal location capability of the target terminal is stored in the AMF, the terminal location capability of the target terminal is sent to the LMF according to the method shown in FIG. 3. In a case that the container containing the terminal location capability of the target terminal is not stored in the AMF, the AMF sends the first indication message to the LMF after notifying the LMF to establish a location service session, where the first indication message carries the indication information for indicating that the terminal location capability of the target terminal is not stored in the AMF.

S703, the LMF acquires the terminal location capability of the target terminal.

In an embodiment, after receiving the first indication message sent by the AMF, the LMF sends an LPP request message to the target terminal according to the first indication message, where the LPP request message is for acquiring the terminal location capability of the target terminal. After receiving the LPP request message sent by the LMF, the target terminal sends the container containing the terminal location capability to the LMF.

In another embodiment, after receiving the location request sent by the AMF, the LMF sends an NRPPa request message to a serving base station of the target terminal according to the location request, where the NRPPa request message is for acquiring the terminal location capability of the target terminal. After receiving the NRPPa request message sent by the LMF, in a case that the terminal location capability of the target terminal for the NRPPa request message is not stored, the base station sends a third capability request message to the target terminal, where the third capability request message is for acquiring the terminal location capability of the target terminal.

After receiving the third capability request message sent by the base station, the target terminal sends the container containing the terminal location capability to the base station according to the third capability request message. After receiving the container containing the terminal location capability sent by the target terminal, the base station sends the NRPPa message to the LMF, where the NRPPa message carries the container containing the terminal location capability of the target terminal.

S704, the LMF sets a location method for the target terminal according to the terminal location capability of the target terminal.

After receiving the terminal location capability of the target terminal sent by the target terminal or the serving base station of the target terminal, the LMF sets the location method for the target terminal according to the terminal location capability of the target terminal.

S705, the LMF sends the terminal location capability of the target terminal to the AMF.

S706, the AMF stores the terminal location capability of the target terminal.

After receiving the terminal location capability of the target terminal sent by the target terminal or the serving base station of the target terminal, the LMF sends the container containing the terminal location capability of the target terminal to the AMF, and the AMF stores the received container containing the terminal location capability of the target terminal in a corresponding terminal context.

Embodiments of the present application further provide a reporting method of a terminal location capability. The process may include the following steps.

Step 1, an AMF receives a location service for a target terminal.

Step 2, the AMF sends an NG interface request message to a serving base station of the target terminal.

The AMF receives the location service for the target terminal and determines whether a container containing a terminal location capability of the target terminal is stored. In a case that the container containing the terminal location capability of the target terminal is stored in the AMF, the terminal location capability of the target terminal is sent to an LMF according to the method shown in FIG. 3. In a case that the container containing the terminal location capability of the target terminal is not stored in the AMF, the AMF sends the NG interface request message to the serving base station of the target terminal, where the NG interface request message is for indicating the base station to acquire the terminal location capability of the target terminal.

Step 3, the base station sends a third capability request message to the target terminal.

After receiving the NG interface request message sent by the AMF, in a case that the terminal location capability of the target terminal for the NG interface request message is not stored, the base station sends the third capability request message to the target terminal, where the third capability request message is for acquiring the terminal location capability of the target terminal.

Step 4, the target terminal sends the terminal location capability of the target terminal to the base station.

After receiving the third capability request message sent by the base station, the target terminal sends the container containing the terminal location capability to the base station according to the third capability request message.

Step 5, the base station sends an NG interface message to the AMF.

Step 6, the AMF stores the terminal location capability of the target terminal.

After receiving the container containing the terminal location capability sent by the target terminal, the base station sends the NG interface message to the AMF, where the NG interface message carries the container containing the terminal location capability of the target terminal. After receiving the NG interface message, the AMF stores the container containing the terminal location capability of the target terminal in a corresponding terminal context.

Step 7, the AMF sends the terminal location capability of the target terminal to the LMF.

Step 8, the LMF sets a location method for the target terminal according to the terminal location capability of the target terminal.

After receiving the NG interface message sent by the base station, the AMF further selects the LMF for the target terminal and sends the terminal location capability of the target terminal to the selected LMF, and the LMF sets the location method for the target terminal according to the terminal location capability of the target terminal.

The reporting method of the terminal location capability provided by the present application is introduced in detail below through some embodiments.

Embodiment 1: Reporting of a terminal location capability.

Embodiment 1-1: A terminal actively reports a container containing a UE location capability to an AMF during registration.

Step 1, UE sends an attach request message to the AMF, where the attach request message carries the container containing the UE location capability.

Step 2, after receiving the attach request message sent by the UE, the AMF takes out the container containing the UE location capability and stores the same in a corresponding UE context.

Embodiment 1-2: When updating the UE location capability, a container containing the updated UE location capability is reported to the AMF through a TAU update process.

Step 1, the UE location capability is changed or updated.

Step 2, the UE initiates the TAU update process, and sends a TAU request message to the AMF, where the TAU request message carries the updated container containing the UE location capability.

Step 3, after receiving the TAU request message sent by the UE, the AMF takes out the container containing the UE location capability and stores the same in the corresponding UE context.

Embodiment 1-3: the AMF triggers a base station to initiate a UE location capability query to request the UE to report its UE location capability information.

Step 1, the AMF sends an NG interface message to the base station to request to acquire the corresponding UE location capability information, and triggers the base station to initiate the UE location capability query to the UE.

Step 2, the base station sends a UE location capability query message to the UE, indicating the UE to report its UE location capability information.

Step 3, the UE transfers a container containing the UE location capability requested by the base station as a response to the base station.

Step 4, after obtaining its UE location capability information from the UE, the base station reports the container containing the UE location capability to the AMF through the NG interface message.

Step 5, after receiving the container containing the UE location capability reported by the base station, the AMF stores the same in the corresponding UE context.

Embodiment 1-4: the LMF triggers the base station to initiate the UE location capability query to request the UE to report its UE location capability information.

Step 1, after a location service session is established in a network, the LMF sends an NRPPa message to the base station to request to acquire the corresponding UE location capability information, and triggers the base station to initiate the UE location capability query to the UE.

Step 2, the base station sends the UE location capability query message to the UE, indicating the UE to report its UE location capability information.

Step 3, the UE transfers the container containing the UE location capability requested by the base station as a response to the base station.

Step 4, after obtaining its UE location capability information from the UE, the base station reports the container containing the UE location capability to the corresponding LMF through the NRPPa message.

Embodiment 2: Interaction between an AMF and an LMF for UE location capability information when the AMF stores the UE location capability information.

Embodiment 2-1: the AMF sends a location request carrying a container containing a UE location capability to a selected LMF.

Step 1, the UE or an external client initiates a location service request to the AMF.

Step 2, the AMF selects a corresponding LMF for the UE or the external client that initiates the location service request.

Step 3, the AMF checks if the container containing the corresponding UE location capability is stored in the AMF.

Step 4, if the container containing the corresponding UE location capability is stored in the AMF, the AMF sends a location request to the selected LMF, where the location request carries the container containing the corresponding UE location capability.

Step 5, if the container containing the corresponding UE location capability is not stored in the AMF, the AMF sends the location request to the selected LMF, where the location request indicates that there is no location capability information of the corresponding UE in the AMF. After receiving the message, the LMF sends an LPP message to the UE to request to acquire the UE location capability information that is not stored in the AMF, or sends an NRPPa message to trigger a base station to initiate a UE location capability acquisition process to acquire the UE location capability information that is not stored in the AMF.

Step 6, after receiving the container containing the UE location capability of the corresponding UE, the LMF transfers the container containing the UE location capability of the UE to the AMF.

Step 7, if the AMF receives a new container containing the UE location capability from the LMF, the AMF stores the same in a corresponding UE context.

Embodiment 2-2: the AMF actively reports its UE location capability information to the LMF.

Step 1, the AMF stores the corresponding UE location capability information in the UE context; and when a location service request arrives, the AMF selects the LMF for the UE and establishes a location service session.

Step 2, the AMF actively queries whether the container containing the location capability of the corresponding UE is stored in its UE context.

Step 3, if the AMF determines that the container containing the location capability of the corresponding UE is stored in its context after querying, the AMF directly transfers the container containing the location capability of the corresponding UE to the LMF selected for the UE.

Embodiment 2-3: after the AMF fails to actively report its UE location capability to the LMF, the AMF initiates acquisition of the UE location capability to a base station.

Step 1, the AMF stores the corresponding UE location capability information in the UE context; and when the location service request arrives, the AMF selects the LMF for the UE and establishes the location service session.

Step 2, the AMF actively queries whether the container containing the location capability of the corresponding UE is stored in its UE context.

Step 3, if the AMF determines that the container containing the location capability of the corresponding UE is not stored in its context after querying, the AMF sends an indication message to the LMF, indicating that there is no location capability information of the corresponding UE in the AMF.

Step 4, the AMF sends an NG interface message to trigger the base station to initiate a UE location capability acquisition process to acquire and store the corresponding UE location capability information.

Step 5, after the AMF acquires the container containing the location capability of the corresponding UE, the AMF transfers the same to the LMF selected for the UE.

Embodiment 2-4: after the AMF fails to actively report its UE location capability to the LMF, the LMF directly initiates an LPP process to acquire the UE location capability.

Step 1, the AMF stores the corresponding UE location capability information in the UE context; and when the location service request arrives, the AMF selects the LMF for the UE and establishes the location service session.

Step 2, the AMF actively queries whether the container containing the location capability of the corresponding UE is stored in its UE context.

Step 3, if the AMF determines that the container containing the location capability of the corresponding UE is not stored in its context after querying, the AMF sends an indication message to the LMF, indicating that there is no location capability information of the corresponding UE in the AMF. In one embodiment, the AMF may further carry indication information in the message to indicate that the LMF initiates a location capability request process to the UE to acquire the UE location capability information of the corresponding UE that is not stored in the AMF.

Step 4, after receiving the message, the LMF sends the LPP message to the UE to request to acquire the UE location capability information of the corresponding UE that is not stored in the AMF.

Step 5, after receiving the LPP capability request message, the UE returns the requested UE location capability information as a response to the LMF.

Step 6, after receiving the UE location capability information returned by UE, the LMF further transfers the UE location capability information to the AMF.

Step 7, if the AMF receives the new UE location capability information from the LMF, the AMF stores the same in the container containing the UE location capability in the corresponding UE context.

Embodiment 2-5: after the AMF fails to actively report its UE location capability to the LMF, the LMF initiates acquisition of the UE location capability to the base station.

Step 1, the AMF stores the corresponding UE location capability information in the UE context; and when the location service request arrives, the AMF selects the LMF for the UE and establishes the location service session.

Step 2, the AMF actively queries whether the container containing the location capability of the corresponding UE is stored in its UE context.

Step 3, if the AMF determines that the container containing the location capability of the corresponding UE is not stored in its context after querying, the AMF sends an indication message to the LMF, indicating that there is no location capability information of the corresponding UE in the AMF. In one embodiment, the AMF may further carry indication information in the message to indicate that the LMF initiates a location capability request process to the UE to acquire the UE location capability information of the corresponding UE that is not stored in the AMF.

Step 4, after receiving the message, the LMF sends the NRPPa message to trigger the base station to initiate the UE location capability acquisition process to acquire the UE location capability information of the corresponding UE that is not stored in the AMF.

Step 5, after receiving the container containing the UE location capability requested by the LMF, the LMF transfers the container containing the UE location capability to the AMF.

Step 6, if the AMF receives the new container containing the UE location capability from the LMF, the AMF stores the same in the corresponding UE context.

Embodiment 2-6: the LMF requests the AMF to report its UE location capability information to the AMF.

Step 1, the AMF stores the corresponding UE location capability information in the UE context; and when the location service request arrives, the AMF selects the LMF for the UE and establishes the location service session.

Step 2, the LMF sends the UE location capability request message to the AMF, to request the specific UE location capability information.

Step 3, after receiving the UE location capability request message, the AMF queries whether the container containing the location capability of the corresponding UE is stored in its UE context.

Step 4, if the AMF determines that the container containing the location capability of the corresponding UE is stored in its context after querying, the AMF returns a location capability request response message to the LMF, where the location capability request response message carries the container containing the UE location capability requested by the LMF.

Embodiment 2-7: after the LMF fails to request the AMF to report its UE location capability, the AMF initiates acquisition of the UE location capability to the base station.

Step 1, the AMF stores the corresponding UE location capability information in the UE context; and when the location service request arrives, the AMF selects the LMF for the UE and establishes the location service session.

Step 2, the LMF sends the UE location capability request message to the AMF, to request the specific UE location capability information.

Step 3, after receiving the UE location capability request message, the AMF queries whether the container containing the location capability of the corresponding UE is stored in its UE context.

Step 4, if the AMF determines that the container containing the location capability of the corresponding UE is not stored in its context after querying, the AMF sends the indication message to the LMF, indicating that the AMF cannot return the requested UE location capability information.

Step 5, the AMF sends the NG interface message to trigger the base station to initiate the UE location capability acquisition process to acquire and store the UE location capability information of the corresponding UE.

Step 6, after acquiring the container containing the location capability of the corresponding UE, the AMF transfers the same to the LMF selected for the UE.

Embodiment 2-8: after the LMF fails to request the AMF to report its UE location capability, the LMF initiates the LPP process to acquire the UE location capability.

Step 1, the AMF stores the corresponding UE location capability information in the UE context; and when the location service request arrives, the AMF selects the LMF for the UE and establishes the location service session.

Step 2, the LMF sends the UE location capability request message to the AMF, to request the specific UE location capability information.

Step 3, after receiving the UE location capability request message, the AMF queries whether the container containing the location capability of the corresponding UE is stored in its UE context.

Step 4, if the AMF determines that the container containing the location capability of the corresponding UE is not stored in its context after querying, the AMF sends the indication message to the LMF, indicating that the AMF cannot return the requested UE location capability information. In one embodiment, the AMF may further carry indication information in the message to indicate that the LMF initiates the location capability request process to the UE to acquire the UE location capability information of the corresponding UE.

Step 5, after receiving the message, the LMF sends the LPP message to the UE to request to acquire the UE location capability information of the corresponding UE that is not stored in the AMF.

Step 6, after receiving the LPP capability request message, the UE returns the requested UE location capability information as a response to the LMF.

Step 7, after receiving the UE location capability information returned by UE, the LMF transfers the UE location capability information to the AMF.

Step 8, if the AMF receives the new UE location capability information from the LMF, the AMF stores the same in the container containing the UE location capability in the corresponding UE context.

Embodiment 2-9: after the LMF fails to request the AMF to report its UE location capability, the LMF initiates acquisition of the UE location capability to the base station.

Step 1, the AMF stores the corresponding UE location capability information in the UE context; and when the location service request arrives, the AMF selects the LMF for the UE and establishes the location service session.

Step 2, the LMF sends the UE location capability request message to the AMF, to request the specific UE location capability information.

Step 3, after receiving the UE location capability request message, the AMF queries whether the container containing the location capability of the corresponding UE is stored in its UE context.

Step 4, if the AMF determines that the container containing the location capability of the corresponding UE is not stored in its context after querying, the AMF sends the indication message to the LMF, indicating that the AMF cannot return the requested UE location capability information. In one embodiment, the AMF may further carry indication information in the message to indicate that the LMF initiates the location capability request process to the UE to acquire the UE location capability information of the corresponding UE.

Step 5, after receiving this message, the LMF sends the NRPPa message to trigger the base station to initiate the UE location capability acquisition process to acquire the UE location capability information of the corresponding UE that is not stored in the AMF.

Step 6, after receiving the container containing the UE location capability requested by the LMF, the LMF transfers the container containing the UE location capability to the AMF.

Step 7, if the AMF receives the new container containing the UE location capability from the LMF, the AMF stores the same in the corresponding UE context.

Figure 8:
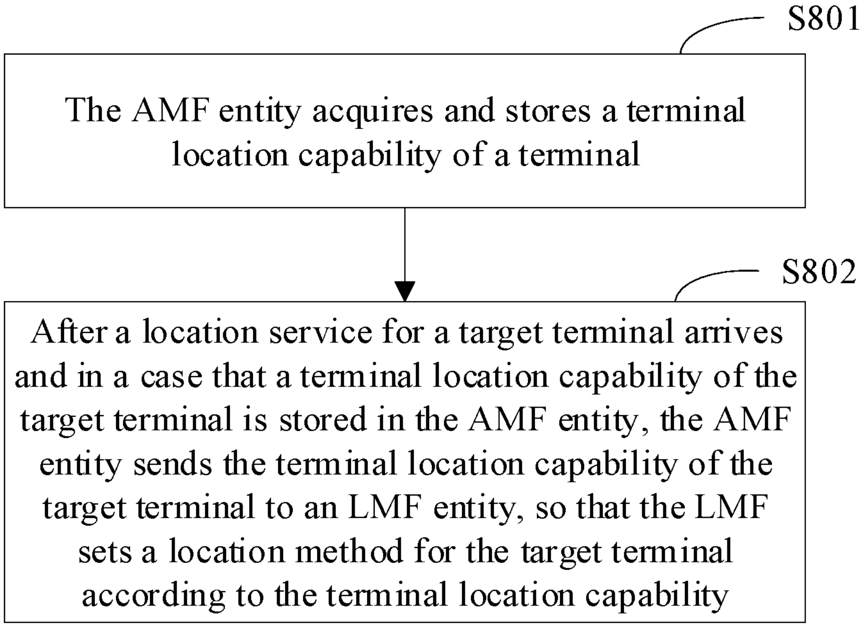
FIG. 8 is a schematic flowchart of a reporting method of a terminal location capability provided by an embodiment of the present application.

One embodiment of the present application further provides a reporting method of a terminal location capability, applied to an AMF entity. As shown in FIG. 8, the method may include the following steps.

Step S801, the AMF entity acquires and stores a terminal location capability of a terminal.

Step S802, after a location service for a target terminal arrives and in a case that a terminal location capability of the target terminal is stored in the AMF entity, the AMF entity sends the terminal location capability of the target terminal to an LMF entity, and the LMF sets a location method for the target terminal according to the terminal location capability. The LMF entity is an LMF entity selected by the AMF entity for the target terminal. 10024511*n* one embodiment, the acquiring and storing, by the AMF entity, the terminal location capability of the terminal includes: acquiring and storing, by the AMF entity, the terminal location capability of the terminal from the terminal; or acquiring and storing, by the AMF entity, the terminal location capability of the target terminal from the LMF entity; or acquiring and storing, by the AMF entity, the terminal location capability of the target terminal from a serving base station of the target terminal.

In one embodiment, the acquiring and storing, by the AMF entity, the terminal location capability of the terminal from the terminal includes: before the location service for the target terminal arrives, receiving, by the AMF entity, an NAS message sent by the terminal, where the NAS message carries a container containing the terminal location capability; and storing, by the AMF entity, the container containing the terminal location capability carried in the NAS message to a terminal context of the terminal.

In one embodiment, the NAS message is an attach request message sent by the terminal after the terminal first accesses to a network; or, the NAS message is a TAU request message sent by the terminal after the terminal location capability of the terminal is updated.

In one embodiment, the acquiring and storing, by the AMF entity, the terminal location capability of the target terminal from the LMF entity includes: after the location service for the target terminal arrives and in a case that the terminal location capability of the target terminal is not stored in the AMF entity, sending, by the AMF entity, a location request to the LMF entity, where the location request carries indication information to indicate that the terminal location capability of the target terminal is not stored in the AMF entity; or, in a case that the terminal location capability of the target terminal is not stored in the AMF entity, notifying, by the AMF entity, the LMF entity to establish a location service session and then sending a first indication message to the LMF entity to indicate that the terminal location capability of the target terminal is not stored in the AMF entity; or, in a case that the AMF entity receives a first capability request message sent by the LMF entity and the terminal location capability of the target terminal is not stored in the AMF entity, sending, by the AMF entity, a first capability request response message to the LMF entity, where the first capability request message indicates acquisition of the terminal location capability of the target terminal, and the first capability request response message indicates that the terminal location capability of the target terminal is not stored in the AMF entity; and receiving, by the AMF entity, a container containing the terminal location capability of the target terminal sent by the LMF entity, and storing the container containing the terminal location capability of the target terminal in a terminal context of the terminal.

In one embodiment, the acquiring and storing, by the AMF entity, the terminal location capability of the target terminal from the serving base station of the target terminal includes: after the location service for the target terminal arrives and in a case that the terminal location capability of the target terminal is not stored in the AMF entity, sending, by the AMF entity, an NG interface request message to the serving base station of the target terminal, where the NG interface request message is for indicating the base station to acquire the terminal location capability of the target terminal; and receiving, by the AMF entity, the NG interface message returned by the base station, and storing a container containing the terminal location capability of the target terminal carried in the NG interface message to a terminal context of the target terminal.

In one embodiment, the sending, by the AMF entity, the terminal location capability of the target terminal to the LMF entity includes: sending, by the AMF entity, a location request for the target terminal to the LMF entity, where the location request carries a container containing the terminal location capability of the target terminal; or sending, by the AMF entity, a second indication message to the LMF entity after notifying the LMF entity to establish a location service session, where the second indication message carries the container containing the terminal location capability of the target terminal.

In one embodiment, before sending, by the AMF entity, the terminal location capability of the target terminal to the LMF entity, the method further includes: receiving, by the AMF entity, a first capability request message sent by the LMF entity, where the first capability request message indicates acquisition of the terminal location capability of the target terminal; where the sending, by the AMF entity, the terminal location capability of the target terminal to the LMF entity includes: sending, by the AMF entity, a second capability request response message carrying a container containing the terminal location capability of the target terminal to the LMF entity according to the first capability request message.

One embodiment of the present application further provides a reporting method of a terminal location capability, applied to a terminal and including: reporting, by the terminal, a terminal location capability of a terminal to an AMF entity; or, reporting, by the terminal, the terminal location capability of the terminal to an LMF entity; or, reporting, by the terminal, the terminal location capability of the terminal to a serving base station of the terminal.

In one embodiment, the reporting, by the terminal, the terminal location capability of the terminal to the AMF entity includes: adding, by the terminal, the terminal location capability to a container and adding the container containing the terminal location capability to an NAS message; and reporting, by the terminal, the NAS message carrying the container containing the terminal location capability to the AMF entity.

In one embodiment, the NAS message is an attach request message; or, the NAS message is a TAU request message.

In one embodiment, the reporting, by the terminal, the terminal location capability of the terminal to the LMF entity includes: in a case that the terminal receives an LPP location capability request message sent by the LMF entity, reporting, by the terminal, the terminal location capability to the LMF entity according to the LPP location capability request message.

In one embodiment, the reporting, by the terminal, the terminal location capability of the terminal to the serving base station of the terminal includes: in a case that the terminal receives a third capability request message sent by the serving base station of the terminal, reporting, by the terminal, the terminal location capability of the terminal to the base station according to the third capability request message.

Figure 9:
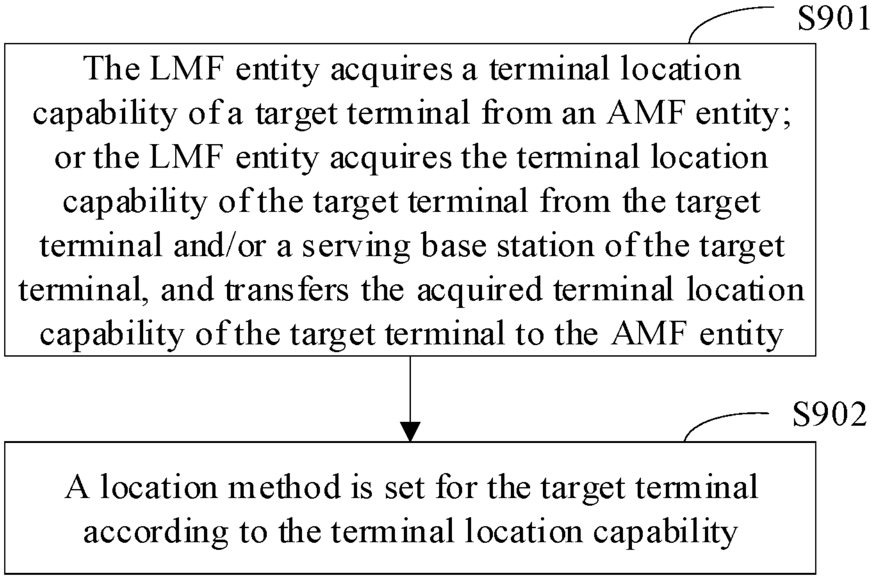
FIG. 9 is a schematic flowchart of another reporting method of a terminal location capability provided by an embodiment of the present application.

One embodiment of the present application further provides a reporting method of a terminal location capability, applied to an LMF entity. As shown in FIG. 9, the method may include the following steps.

Step S901, the LMF entity acquires a terminal location capability of a target terminal from an AMF entity; or the LMF entity acquires the terminal location capability of the target terminal from the target terminal and/or a serving base station of the target terminal, and transfers the acquired terminal location capability of the target terminal to the AMF entity.

Step S902, a location method is set for the target terminal according to the terminal location capability.

In one embodiment, the acquiring, by the LMF entity, the terminal location capability of the target terminal from the AMF entity includes: after a location service for the target terminal arrives, receiving, by the LMF entity, a location request for the target terminal sent by the AMF entity, where the location request carries a container containing the terminal location capability of the target terminal; or after a location service session is established, receiving, by the LMF entity, a second indication message sent by the AMF entity, where the second indication message carries the container containing the terminal location capability of the target terminal.

In one embodiment, before acquiring, by the LMF entity, the terminal location capability of the target terminal from the AMF entity, the method further includes: sending, by the LMF entity, a first capability request message to the AMF entity, where the first capability request message indicates acquisition of the terminal location capability of the target terminal; where the acquiring, by the LMF entity, the terminal location capability of the target terminal from the AMF entity includes: receiving, by the LMF entity, a second capability request response message carrying a container containing the terminal location capability of the target terminal sent by the AMF entity.

In one embodiment, before acquiring, by the LMF entity, the terminal location capability of the target terminal from the target terminal and/or the serving base station of the target terminal, the method further includes: receiving, by the LMF entity, a location request sent by the AMF entity, where the location request carries indication information for indicating that the terminal location capability of the target terminal is not stored in the AMF entity; or receiving, by the LMF entity, a first indication message sent by the AMF entity after the AMF entity notifies the LMF entity to establish a location service session, where the first indication message indicates that the terminal location capability of the target terminal is not stored in the AMF entity; or receiving, by the LMF entity, a first capability request response message sent by the AMF entity, where the first capability request response message is a response message of the AMF entity for the first capability request message sent by the LMF entity, the first capability request message indicates acquisition of the terminal location capability of the target terminal, and the first capability request response message indicates that the terminal location capability of the target terminal is not stored in the AMF entity.

In one embodiment, the acquiring, by the LMF entity, the terminal location capability of the target terminal from the target terminal and/or the serving base station of the target terminal includes: sending, by the LMF entity, an LPP request message to the target terminal, and receiving, by the LMF entity, the terminal location capability sent by the target terminal; or, sending, by the LMF entity, an NRPPa request message to the serving base station of the target terminal, where the NRPPa request message is for indicating the serving base station of the target terminal to acquire the terminal location capability of the target terminal; and receiving, by the LMF entity, the NRPPa message returned by the serving base station of the target terminal, where the NRPPa message carries the terminal location capability of the target terminal.

Figure 10:
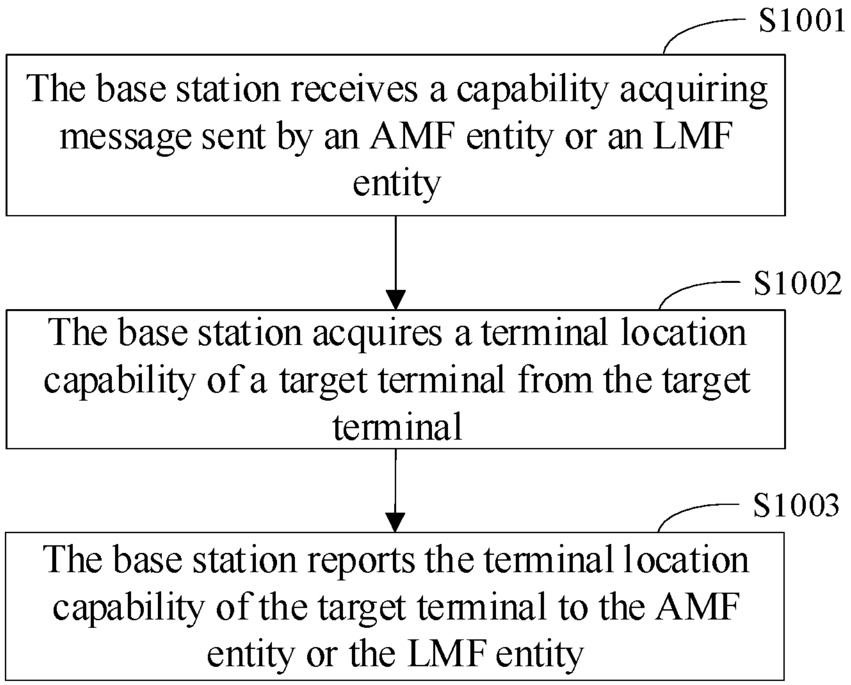
FIG. 10 is a schematic flowchart of another reporting method of a terminal location capability provided by an embodiment of the present application.

One embodiment of the present application further provides a reporting method of a terminal location capability, applied to a base station. As shown in FIG. 10, the method may include the following steps.

Step S1001, the base station receives a capability acquiring message sent by an AMF entity or an LMF entity.

Step S1002, the base station acquires a terminal location capability of a target terminal from the target terminal.

Step S1003, the base station reports the terminal location capability of the target terminal to the AMF entity or the LMF entity.

In one embodiment, the receiving, by the base station, the capability acquiring message sent by the AMF entity or the LMF entity includes: receiving, by the base station, an NG interface request message sent by the AMF entity, where the NG interface request message is for indicating the base station to acquire the terminal location capability of the target terminal; and receiving, by the base station, an NRPPa message sent by the LMF entity, where the NRPPa request message is for indicating the base station to acquire the terminal location capability of the target terminal.

In one embodiment, the reporting, by the base station, the terminal location capability of the target terminal to the AMF entity or the LMF entity includes: reporting, by the base station, a container containing the terminal location capability of the target terminal to the AMF entity through an NG interface message; or reporting, by the base station, the container containing the terminal location capability of the target terminal to the LMF entity through an NRPPa message.

In one embodiment, the acquiring, by the base station, the terminal location capability of the target terminal from the target terminal includes: sending, by the base station, a third capability request message to the target terminal to request to acquire the terminal location capability of the target terminal; and receiving, by the base station, the terminal location capability of the target terminal returned by the target terminal.

One embodiment of the present application further provides an AMF entity that can implement the flow executed by the aforementioned implementation.

Figure 11:
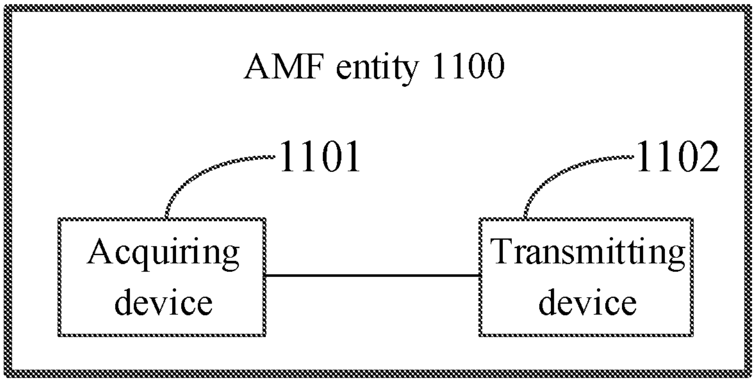
FIG. 11 is a schematic structural diagram of an AMF entity provided by an embodiment of the present application.

FIG. 11 is a schematic structural diagram of an AMF entity provided by an embodiment of the present application. As shown in FIG. 11, the AMF entity 1100 includes: an acquiring device 1101 and a transmitting device 1102.

The acquiring device 1101 is configured to acquire and store a terminal location capability of a terminal.

The transmitting device 1102 is configured to send, after a location service for a target terminal arrives and in a case that a terminal location capability of the target terminal is stored, the terminal location capability of the target terminal to an LMF entity, and the LMF sets a location method for the target terminal according to the terminal location capability, where the LMF entity is an LMF entity selected by the AMF entity for the target terminal.

In one embodiment, the acquiring device 1101 is configured to acquire and store the terminal location capability of the terminal from the terminal; or acquire and store the terminal location capability of the target terminal from the LMF entity; or acquire and store the terminal location capability of the target terminal from a serving base station of the target terminal.

In one embodiment, the acquiring device 1101 is further configured to receive an NAS message sent by the terminal before the location service for the target terminal arrives, where the NAS message carries a container containing the terminal location capability; and store the container containing the terminal location capability carried in the NAS message to a terminal context of the terminal.

In one embodiment, the NAS message is an attach request message sent by the terminal after the terminal first accesses to a network; or, the NAS message is a TAU request message sent by the terminal after the terminal location capability of the terminal is updated.

In one embodiment, the acquiring device 1101 is further configured to send, after the location service for the target terminal arrives and in a case that the terminal location capability of the target terminal is not stored, a location request to the LMF entity, where the location request carries indication information to indicate that the terminal location capability of the target terminal is not stored in the AMF entity; or, notify, in a case that the terminal location capability of the target terminal is not stored, the LMF entity to establish a location service session and then send a first indication message to the LMF entity to indicate that the terminal location capability of the target terminal is not stored in the AMF entity; or, send, in a case that a first capability request message sent by the LMF entity is received and the terminal location capability of the target terminal is not stored, a first capability request response message to the LMF entity, where the first capability request message indicates acquisition of the terminal location capability of the target terminal, and the first capability request response message indicates that the terminal location capability of the target terminal is not stored in the AMF entity; and receive the container containing the terminal location capability of the target terminal sent by the LMF entity, and store the container containing the terminal location capability of the target terminal in the terminal context of the terminal.

In one embodiment, the acquiring device 1101 is further configured to send, after the location service for the target terminal arrives and in a case that the terminal location capability of the target terminal is not stored, an NG interface request message to the serving base station of the target terminal, where the NG interface request message is for indicating the base station to acquire the terminal location capability of the target terminal; and receive the NG interface message returned by the base station, and store the container containing the terminal location capability of the target terminal carried in the NG interface message to the terminal context of the target terminal.

In one embodiment, the transmitting device 1102 may be configured to send a location request for the target terminal to the LMF entity, where the location request carries the container containing the terminal location capability of the target terminal; or send, after notifying the LMF entity to establish a location service session, a second indication message to the LMF entity, where the second indication message carries the container containing the terminal location capability of the target terminal.

In one embodiment, the acquiring device 1101 is further configured to receive a first capability request message sent by the LMF entity, where the first capability request message indicates acquisition of the terminal location capability of the target terminal; and send a second capability request response message carrying the container containing the terminal location capability of the target terminal to the LMF entity according to the first capability request message.

It should be noted here that the above AMF entity provided by the embodiments of the present application can implement all the method steps implemented by the AMF entity in the above method embodiments, and can achieve the same effect, and the parts and beneficial effects the same as the method embodiments in the present embodiments will not be repeated here.

One embodiment of the present application further provides a terminal that can implement the flow executed by the aforementioned implementation.

Figure 12:
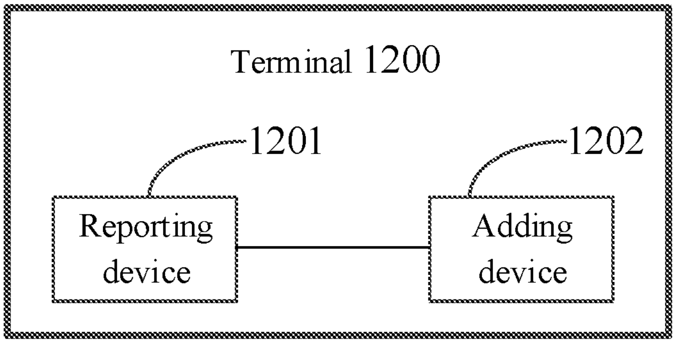
FIG. 12 is a schematic structural diagram of a terminal provided by an embodiment of the present application.

FIG. 12 is a schematic structural diagram of a terminal provided by an embodiment of the present application. As shown in FIG. 12, the terminal 1200 includes a reporting device 1201.

The reporting device 1201 is configured to report a terminal location capability of the terminal to an AMF entity; or, report the terminal location capability of the terminal to an LMF entity; or, report the terminal location capability of the terminal to a serving base station of the terminal.

In one embodiment, the above terminal may further include an adding device 1202, configured to add the terminal location capability to a container and add the container containing the terminal location capability to an NAS message; and the reporting device 1201 is further configured to report the NAS message carrying the container containing the terminal location capability to the AMF entity.

In one embodiment, the NAS message is an attach request message; or, the NAS message is a TAU request message.

In one embodiment, the reporting device 1201 is further configured to report, in a case that an LPP location capability request message sent by the LMF entity is received, the terminal location capability to the LMF entity according to the LPP location capability request message.

In one embodiment, the reporting device 1201 is further configured to report, in a case that a third capability request message sent by the serving base station of the terminal is received, the terminal location capability of the terminal to the base station according to the third capability request message.

It should be noted here that the above terminal provided by the embodiments of the present application can implement all the method steps implemented by the terminal in the above method embodiments, and can achieve the same effect, and the parts and beneficial effects the same as the method embodiments in the present embodiments will not be described in detail here.

One embodiment of the present application further provides an LMF entity. The LMF entity can implement the flow executed by the aforementioned implementation.

Figure 13:
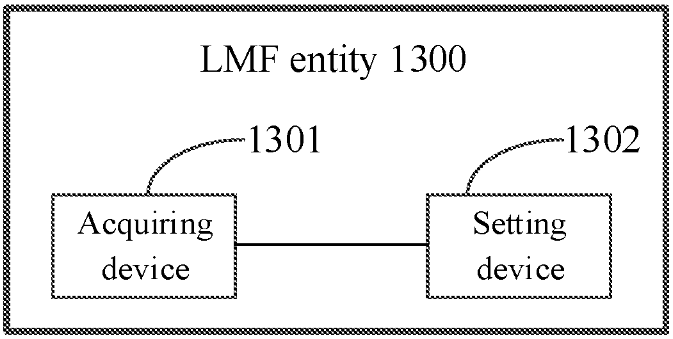
FIG. 13 is a schematic structural diagram of an LMF entity provided by an embodiment of the present application.

FIG. 13 is a schematic structural diagram of an LMF entity provided by an embodiment of the present application. As shown in FIG. 13, the LMF entity 1300 includes: an acquiring device 1301 and a setting device 1302.

The acquiring device 1301 is configured to acquire a terminal location capability of a target terminal from an AMF entity; or acquire the terminal location capability of the target terminal from the target terminal and/or a serving base station of the target terminal, and transfer the acquired terminal location capability of the target terminal to the AMF entity.

The setting device 1302 is configured to set a location method for the target terminal according to the terminal location capability.

In one embodiment, the acquiring device 1301 may be configured to receive, after a location service for the target terminal arrives, a location request for the target terminal sent by the AMF entity, where the location request carries a container containing the terminal location capability of the target terminal; or receive, after a location service session is established, a second indication message sent by the AMF entity, where the second indication message carries the container containing the terminal location capability of the target terminal.

In one embodiment, the acquiring device 1301 is further configured to send a first capability request message sent by the AMF entity, where the first capability request message indicates acquisition of the terminal location capability of the target terminal; and receive a second capability request response message carrying the container containing the terminal location capability of the target terminal sent by the AMF entity.

In one embodiment, the acquiring device 1301 is further configured to receive a location request sent by the AMF entity, where the location request carries indication information for indicating that the terminal location capability of the target terminal is not stored in the AMF entity; or receive a first indication message sent by the AMF entity after the AMF entity notifies to establish a location service session, where the first indication message indicates that the terminal location capability of the target terminal is not stored in the AMF entity; or receive a first capability request response message sent by the AMF entity, where the first capability request response message is a response message of the AMF entity for the sent first capability request message, the first capability request message indicates acquisition of the terminal location capability of the target terminal, and the first capability request response message indicates that the terminal location capability of the target terminal is not stored in the AMF entity.

In one embodiment, the acquiring device 1301 is further configured to: send an LPP request message to the target terminal, and receive the terminal location capability sent by the target terminal; or, send an NRPPa request message to the serving base station of the target terminal, where the NRPPa request message is for indicating the serving base station of the target terminal to acquire the terminal location capability of the target terminal; and receive the NRPPa message returned by the serving base station of the target terminal, where the NRPPa message carries the terminal location capability of the target terminal.

It should be noted here that the above LMF entity provided by the embodiments of the present application can implement all the method steps implemented by the LMF entity in the above method embodiments, and can achieve the same effect, and the parts and beneficial effects the same as the method embodiments in the present embodiments will not be described in detail here.

One embodiment of the present application further provides a base station that can implement the flow executed by the aforementioned implementation.

Figure 14:
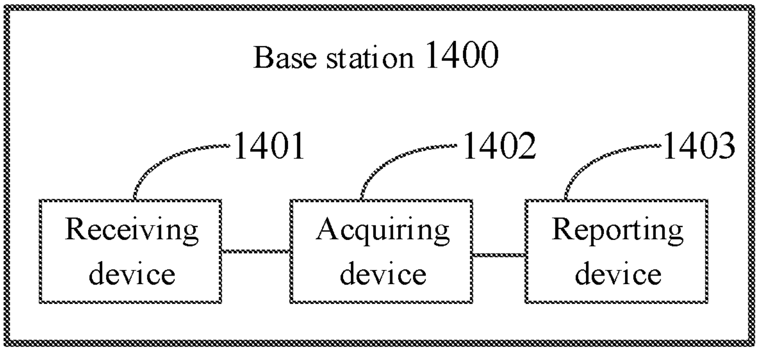
FIG. 14 is a schematic structural diagram of a base station provided by an embodiment of the present application.

FIG. 14 is a schematic structural diagram of a base station provided by an embodiment of the present application. As shown in FIG. 14, the base station 1400 includes: a receiving device 1401, an acquiring device 1402 and a reporting device 1403.

The receiving device 1401 is configured to receive a capability acquiring message sent by an AMF entity or an LMF entity.

The acquiring device 1402 is configured to acquire a terminal location capability of a target terminal from the target terminal.

The reporting device 1403 is configured to report the terminal location capability of the target terminal to the AMF entity or the LMF entity.

In one embodiment, the receiving device 1401 is configured to receive an NG interface request message sent by the AMF entity, where the NG interface request message is for indicating the base station to acquire the terminal location capability of the target terminal; and receive an NRPPa message sent by the LMF entity, where the NRPPa request message is for indicating the base station to acquire the terminal location capability of the target terminal.

In one embodiment, the reporting device 1403 is configured to report a container containing the terminal location capability of the target terminal to the AMF entity through an NG interface message; or report the container containing the terminal location capability of the target terminal to the LMF entity through an NRPPa message.

In one embodiment, the acquiring device 1402 is configured to send a third capability request message to the target terminal to request to acquire the terminal location capability of the target terminal; and receive the terminal location capability of the target terminal returned by the target terminal.

It should be noted here that the above base station provided by the embodiments of the present application can implement all the method steps implemented by the base station in the above method embodiments, and can achieve the same effect, and the parts and beneficial effects the same as the method embodiments in the present embodiments will not be described in detail here.

One embodiment of the present application further provides an AMF entity that can implement the flow executed by FIG. 8 in the aforementioned embodiments.

Figure 15:
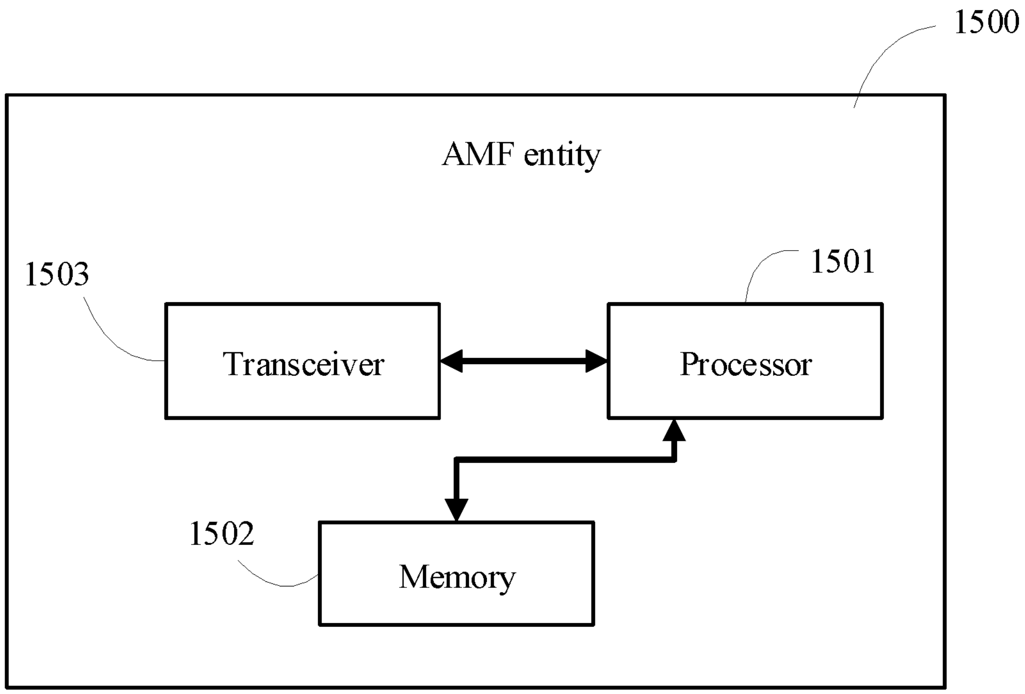
FIG. 15 is a schematic structural diagram of another AMF entity provided by an embodiment of the present application.

FIG. 15 shows a schematic structural diagram of an AMF entity 1500 provided by an embodiment of the present application, that is, shows another schematic structural diagram of an AMF entity 1100. As shown in FIG. 15, the AMF entity 1500 includes a processor 1501 and a memory 1502, and further includes a transceiver 1503. The processor 1501 may also be a controller. The processor 1501 is configured to support an AMF to execute functions involved in the aforementioned flow. The memory 1502 is used for being coupled with processor 1501, and stores necessary program instructions and data for the AMF. The processor 1501 is connected with the memory 1502, the memory 1502 is used for storing instructions, and the processor 1501 is used for reading and executing the instructions stored in the memory 1502 to complete steps of the AMF executing corresponding functions in the above method.

In the embodiments of the present application, concepts, explanations, detailed explanations and other steps related to the embodiments of the present application and involved in the AMF entity 1100 and the AMF entity 1500 refer to description of these content related in the aforementioned method or other embodiments, which will not be repeated here.

It should be noted that the above processor involved in the embodiments of the present application may be a central processing unit (CPU), a general purpose processor, a digital signal processor (DSP), an application-specific integrated circuit (ASIC), a field programmable gate array (FPGA) or other programmable logic devices, transistor logic devices, hardware components and any combination thereof. The processor may implement or execute various exemplary logic blocks, modules and circuits described in combination with the contents disclosed by the present application. The processor may also be a combination implementing a computing function, for example, a combination containing one or more microprocessors, a combination of the DSP and the microprocessor, etc. The memory may be integrated into the processor or arranged separately from the processor.

It should be noted here that the above AMF entity provided by the embodiments of the present application can implement all the method steps implemented by the AMF entity in the above method embodiments, and can achieve the same effect, and the parts and beneficial effects the same as the method embodiments in the present embodiment will not be described in detail here.

One embodiment of the present application further provides a terminal that can implement the flow executed by the terminal in the aforementioned embodiments.

Figure 16:
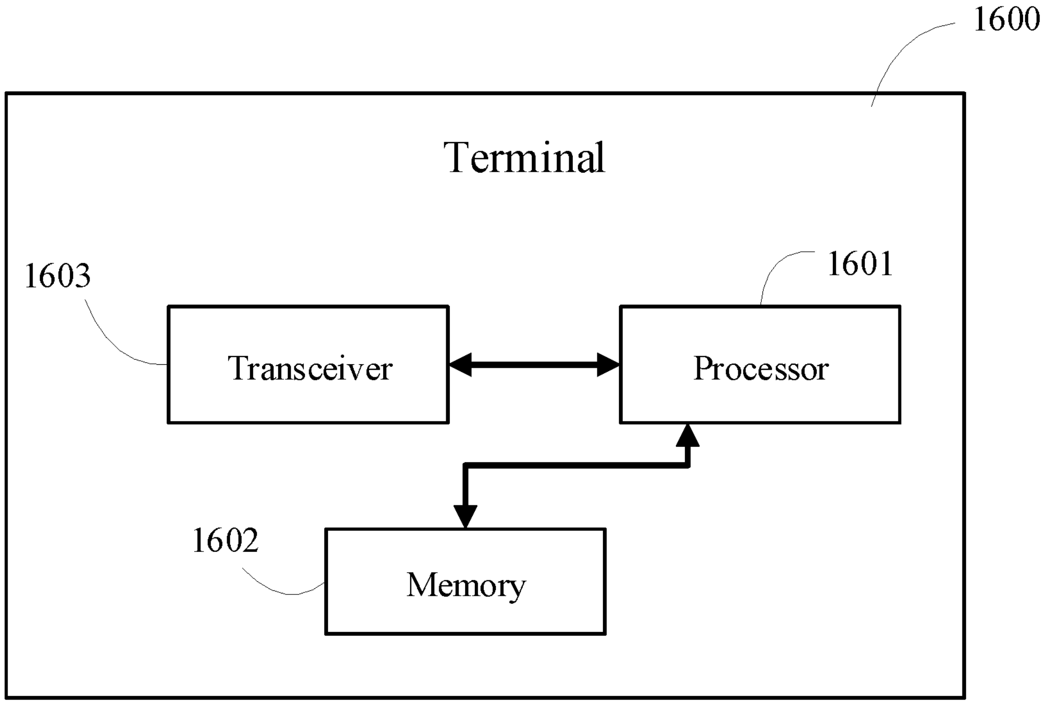
FIG. 16 is a schematic structural diagram of another terminal provided by an embodiment of the present application.

FIG. 16 shows a schematic structural diagram of a terminal 1600 provided by an embodiment of the present application, that is, showing another schematic structural diagram of a terminal 1200. As shown in FIG. 16, the terminal 1600 includes a processor 1601 and a memory 1602, and further includes a transceiver 1603. The processor 1601 may also be a controller. The processor 1601 is configured to support the terminal to execute functions involved in the aforementioned flow. The memory 1602 is used for being coupled with processor 1601, and stores necessary program instructions and data for the terminal. The processor 1601 is connected with the memory 1602, the memory 1602 is used for storing instructions, and the processor 1601 is used for reading and executing the instructions stored in the memory 1602 to complete steps of the terminal executing corresponding functions in the above method.

In the embodiment of the present application, concepts, explanations, detailed explanations and other steps related to the embodiments of the present application and involved in the terminal 1200 and the terminal 1600 refer to description of these content related in the aforementioned method or other embodiments, which will not be repeated here.

It should be noted that the above mentioned processor in the embodiments of the present application may be a CPU, a DSP, an ASIC, an FPGA or other programmable logic devices, transistor logic devices, hardware components, or any combination thereof. The processor may implement or execute various exemplary logic blocks, modules and circuits described in combination with the contents disclosed by the present application. The processor may also be a combination implementing a computing function, for example, a combination containing one or more microprocessors, a combination of the DSP and the microprocessor, etc. The memory may be integrated into the processor or arranged separately from the processor.

It should be noted here that the above terminal provided by the embodiments of the present application can implement all the method steps implemented by the terminal in the above method embodiments, and can achieve the same effect, and the parts and beneficial effects the same as the method embodiments in the present embodiments will not be described in detail here.

One embodiment of the present application further provides an LMF entity that can implement the flow executed by FIG. 9 in the aforementioned embodiments.

Figure 17:
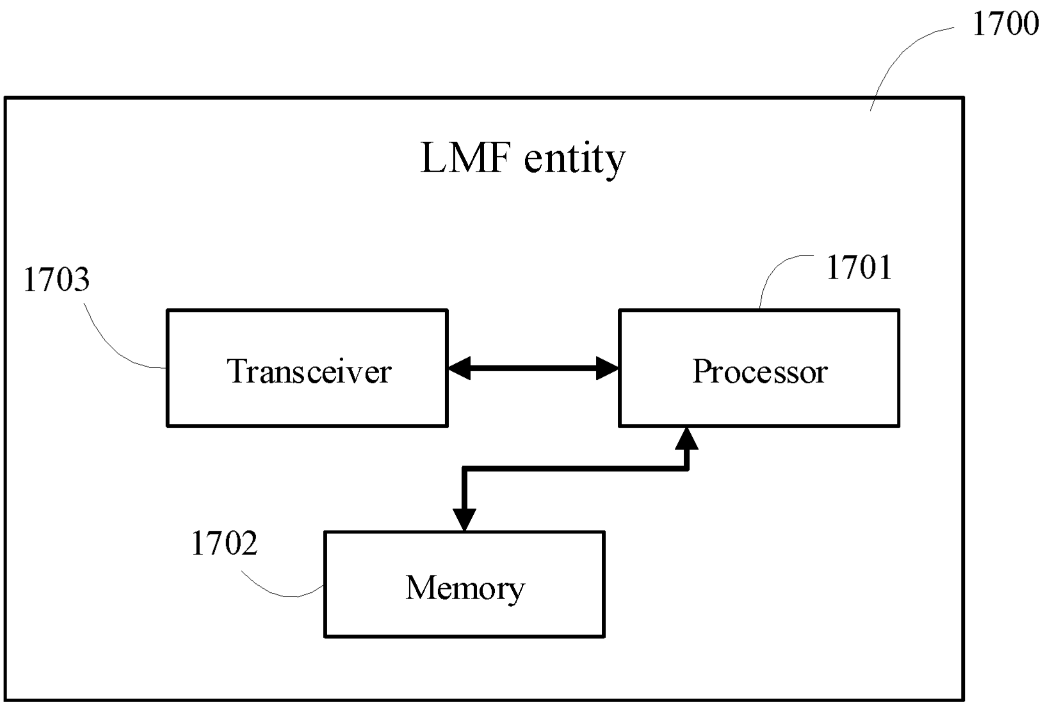
FIG. 17 is a schematic structural diagram of another LMF entity provided by an embodiment of the present application.

FIG. 17 shows a schematic structural diagram of an LMF entity 1700 provided by an embodiment of the present application, that is, showing another schematic structural diagram of an LMF entity 1300. As shown in FIG. 17, the LMF entity 1700 includes a processor 1701 and a memory 1702, and further includes a transceiver 1703. The processor 1701 may also be a controller. The processor 1701 is configured to support the LMF entity to execute functions involved in the aforementioned flow. The memory 1702 is used for being coupled with processor 1701, and stores necessary program instructions and data for the LMF entity. The processor 1701 is connected with the memory 1702, the memory 1702 is used for storing instructions, and the processor 1701 is used for reading and executing the instructions stored in the memory 1702 to complete steps of the LMF entity executing corresponding functions in the above method.

In the embodiments of the present application, concepts, explanations, detailed explanations and other steps related to the embodiments of the present application and involved in the LMF entity 1300 and the LMF entity 1700 refer to description of these content related in the aforementioned method or other embodiments, which will not be repeated here.

It should be noted that the above mentioned processor in the embodiments of the present application may be a CPU, a DSP, an ASIC, an FPGA or other programmable logic devices, transistor logic devices, hardware components, or any combination thereof. The processor may implement or execute various exemplary logic blocks, modules and circuits described in combination with the contents disclosed by the present application. The processor may also be a combination implementing a computing function, for example, a combination containing one or more microprocessors, a combination of the DSP and the microprocessor, etc. The memory may be integrated into the processor or arranged separately from the processor.

It should be noted here that the above LMF entity provided by the embodiments of the present application can implement all the method steps implemented by the LMF entity in the above method embodiments, and can achieve the same effect, and the parts and beneficial effects the same as the method embodiments in the present embodiments will not be described in detail here.

One embodiment of the present application further provides a base station that can implement the flow executed by FIG. 10 in the aforementioned embodiments.

Figure 18:
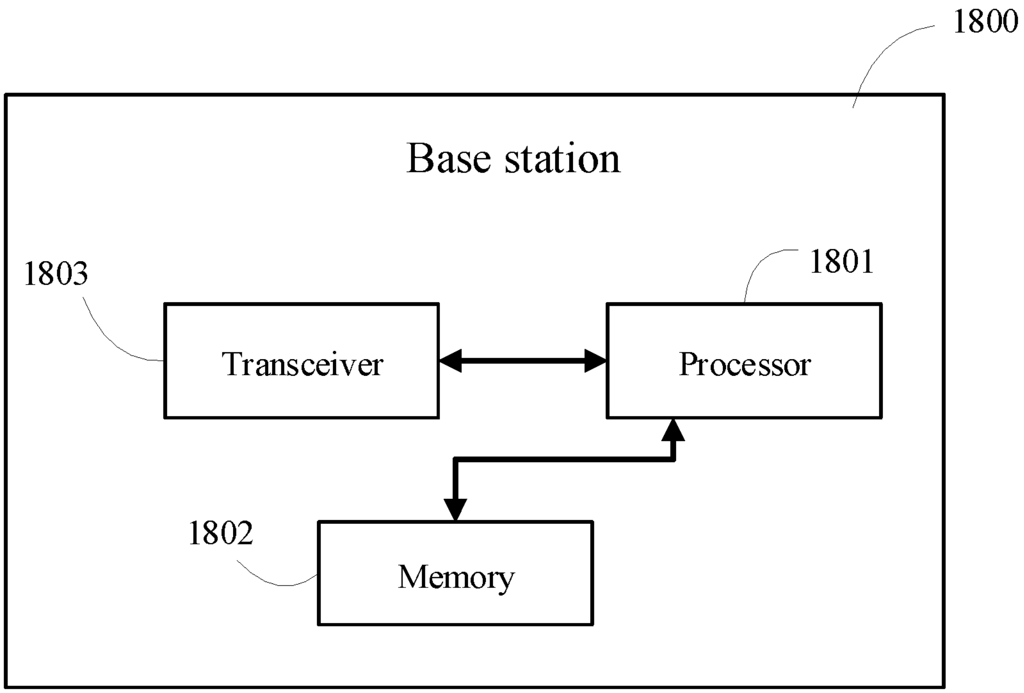
FIG. 18 is a schematic structural diagram of another base station provided by an embodiment of the present application.

FIG. 18 shows a schematic structural diagram of a base station 1800 provided by an embodiment of the present application, that is, showing another schematic structural diagram of a base station 1400. As shown in FIG. 18, the base station 1800 includes a processor 1801 and a memory 1802, and further includes a transceiver 1803. The processor 1801 may also be a controller. The processor 1801 is configured to support the base station to execute functions involved in the aforementioned flow. The memory 1802 is used for being coupled with processor 1801, and stores necessary program instructions and data for the base station. The processor 1801 is connected with the memory 1802, the memory 1802 is used for storing instructions, and the processor 1801 is used for reading and executing the instructions stored in the memory 1802 to complete steps of the base station executing corresponding functions in the above method.

In the embodiments of the present application, concepts, explanations, detailed explanations and other steps related to the embodiments of the present application and involved in the base station 1400 and the base station 1800 refer to description of these content related in the aforementioned method or other embodiments, which will not be repeated here.

It should be noted that the above mentioned processor in the embodiments of the present application may be a CPU, a DSP, an ASIC, an FPGA or other programmable logic devices, transistor logic devices, hardware components, or any combination thereof. The processor may implement or execute various exemplary logic blocks, modules and circuits described in combination with the contents disclosed by the present application. The processor may also be a combination implementing a computing function, for example, a combination containing one or more microprocessors, a combination of the DSP and the microprocessor, etc. The memory may be integrated into the processor or arranged separately from the processor.

It should be noted here that the above base station provided by the embodiments of the present application can implement all the method steps implemented by the base station in the above method embodiments, and can achieve the same effect, and the parts and beneficial effects the same as the method embodiments in the present embodiments will not be described in detail here.

One embodiment of the present application further provides a computer readable storage medium. The computer readable storage medium stores computer executable instructions, and the computer executable instructions are used for causing a computer to execute the flow executed in FIG. 8.

One embodiment of the present application further provides a computer readable storage medium. The computer readable storage medium stores computer executable instructions, and the computer executable instructions are used for causing a computer to execute the flow executed in the terminal.

One embodiment of the present application further provides a computer readable storage medium. The computer readable storage medium stores computer executable instructions, and the computer executable instructions are used for causing a computer to execute the flow executed in FIG. 9.

One embodiment of the present application further provides a computer readable storage medium. The computer readable storage medium stores computer executable instructions, and the computer executable instructions are used for causing a computer to execute the flow executed in FIG. 10.

One embodiment of the present application further provides a computer program product. Instructions in the computer program product, when executed by a processor or an electronic device, cause the processor to execute the flow of the method shown in FIG. 8.

One embodiment of the present application further provides a computer program product. Instructions in the computer program product, when executed by a processor or an electronic device, cause the processor to execute the flow executed by the terminal.

One embodiment of the present application further provides a computer program product. Instructions in the computer program product, when executed by a processor or an electronic device, cause the processor to execute the flow of the method shown in FIG. 9.

One embodiment of the present application further provides a computer program product. Instructions in the computer program product, when executed by a processor or an electronic device, cause the processor to execute the flow of the method shown in FIG. 10.

The present application is described with reference to flow diagrams and/or block diagrams of the methods, the devices (systems), and computer program products according to the embodiments of the present application. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, and the instructions, when executed by the processor of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generate an article of manufacture that includes a commander apparatus that implements the functions specified in one or more flows in the flow diagrams and/or one or more blocks in the block diagrams.

These computer program instructions may also be loaded to the computer or other programmable data processing devices, and a series of operating steps are executed on the computer or other programmable devices to generate computer-implemented processing, and the instructions executed on the computer or other programmable devices provide steps for implementing the functions specified in one or more flows in the flow diagrams and/or one or more blocks in the block diagrams.

Although the only some of the embodiments of the present application have been described, additional modifications and variations on these embodiments may be made. Therefore, the appended claims intend to be explained as including some embodiments and all modifications and variations falling within the scope of the present application.

Various modifications and variations to the present application may be made. In this way, if these modifications and variations of the present application fall within the scope of the claims of the present application and their equivalent art, the present application also intends to include these modifications and variations.

What is claimed is:

1. A reporting method of a terminal location capability, applied to an access and mobility management function (AMF) entity, and comprising:

sending, in a case that the terminal location capability of a target terminal is stored in the AMF entity, the terminal location capability of the target terminal to a location management function (LMF) entity after a location service for the target terminal arrives, wherein the LMF entity sets a location method for the target terminal according to the terminal location capability;

wherein the LMF entity is an LMF entity selected by the AMF entity for the target terminal;

wherein the terminal location capability of the terminal is acquired and stored by:

acquiring and storing the terminal location capability of the terminal from the LMF entity.

2. The method according to claim 1, wherein the acquiring and storing the terminal location capability of the target terminal from the LMF entity comprises: an operation 1 and an operation 2; or an operation 2;

wherein the operation 1 comprises at least one of an operation 11, an operation 12, or an operation 13;

the operation 11 comprises: sending, in a case that the terminal location capability of the target terminal is not stored in the AMF entity after the location service for the target terminal arrives, a location request to the LMF entity, wherein the location request carries indication information to indicate that the terminal location capability of the target terminal is not stored in the AMF entity;

the operation 12 comprises: notifying, in a case that the terminal location capability of the target terminal is not stored in the AMF entity, the LMF entity to establish a location service session and then sending a first indication message to the LMF entity to indicate that the terminal location capability of the target terminal is not stored in the AMF entity;

the operation 13 comprises: sending a first capability request response message to the LMF entity in a case that the AMF entity receives a first capability request message sent by the LMF entity and the terminal location capability of the target terminal is not stored in the AMF entity; wherein the first capability request message indicates acquiring the terminal location capability of the target terminal, and the first capability request response message indicates that the terminal location capability of the target terminal is not stored in the AMF entity; and the operation 2 comprises: receiving a container containing the terminal location capability of the target terminal sent by the LMF entity, and storing the container containing the terminal location capability of the target terminal in a terminal context of the terminal.

3. The method according to claim 1, wherein the sending the terminal location capability of the target terminal to the LMF entity comprises:

sending a location request for the target terminal to the LMF entity, wherein the location request carries a container containing the terminal location capability of the target terminal; or sending a second indication message to the LMF entity after notifying the LMF entity to establish a location service session, wherein the second indication message carries a container containing the terminal location capability of the target terminal.

4. The method according to claim 1, wherein before sending the terminal location capability of the target terminal to the LMF entity, the method further comprises:

receiving a first capability request message sent by the LMF entity, wherein the first capability request message indicates acquiring the terminal location capability of the target terminal;

wherein the sending the terminal location capability of the target terminal to the LMF entity comprises:

sending a second capability request response message carrying a container containing the terminal location capability of the target terminal to the LMF entity according to the first capability request message.

5. An access and mobility management function (AMF) entity, comprising: a memory, a transceiver and a processor, wherein the memory is configured to store computer instructions;

the transceiver is configured to receive and send data under control of the processor; and the processor is configured to read a computer program in the memory and execute the method of claim 1.

6. The AMF entity according to claim 5, wherein the processor is specifically configured to:

acquire and store the terminal location capability of the terminal from the terminal; or acquire and store the terminal location capability of the target terminal from the LMF entity; or acquire and store the terminal location capability of the target terminal from a serving base station of the target terminal.

7. The AMF entity according to claim 5, wherein the processor is specifically configured to:

send a location request for the target terminal to the LMF entity, wherein the location request carries a container containing the terminal location capability of the target terminal; or send, after notifying the LMF entity to establish a location service session, a second indication message to the LMF entity, wherein the second indication message carries a container containing the terminal location capability of the target terminal.

8. A reporting method of a terminal location capability, applied to a location management function (LMF) entity, and comprising:

acquiring the terminal location capability of the target terminal from a serving base station of the target terminal, and transferring the acquired terminal location capability of the target terminal to the AMF entity; and setting a location method for the target terminal according to the terminal location capability.

9. The method according to claim 8, wherein the acquiring the terminal location capability of the target terminal from the AMF entity comprises:

receiving, after a location service for the target terminal arrives, a location request for the target terminal sent by the AMF entity, wherein the location request carries a container containing the terminal location capability of the target terminal; or receiving, after a location service session is established, a second indication message sent by the AMF entity, wherein the second indication message carries a container containing the terminal location capability of the target terminal.

10. The method according to claim 8, wherein before acquiring the terminal location capability of the target terminal from the AMF entity, the method further comprises:

sending a first capability request message to the AMF entity, wherein the first capability request message indicates acquiring the terminal location capability of the target terminal;

wherein the acquiring the terminal location capability of the target terminal from the AMF entity comprises:

receiving a second capability request response message carrying a container containing the terminal location capability of the target terminal sent by the AMF entity; or, wherein before acquiring the terminal location capability of the target terminal from the target terminal and/or the serving base station of the target terminal, the method further comprises:

receiving a location request sent by the AMF entity, wherein the location request carries indication information for indicating that the terminal location capability of the target terminal is not stored in the AMF entity; or receiving a first indication message sent by the AMF entity after the AMF entity notifies the LMF entity to establish a location service session, wherein the first indication message indicates that the terminal location capability of the target terminal is not stored in the AMF entity; or receiving a first capability request response message sent by the AMF entity, wherein the first capability request response message is a response message of the AMF entity for the first capability request message sent by the LMF entity, the first capability request message indicates acquiring the terminal location capability of the target terminal, and the first capability request response message indicates that the terminal location capability of the target terminal is not stored in the AMF entity.

11. The method according to claim 8, wherein the acquiring the terminal location capability of the target terminal from the target terminal, comprises:

sending a long term evolution positioning protocol (LPP) request message to the target terminal, and receiving the terminal location capability sent by the target terminal.

12. A location management function (LMF) entity, comprising: a memory, a transceiver and a processor, wherein the memory is configured to store computer instructions;

the transceiver is configured to receive and send data under control of the processor; and the processor is configured to read a computer program in the memory and execute the method of claim 8.

13. The LMF entity according to claim 12, wherein the processor is specifically configured to:

receive, after a location service for the target terminal arrives, a location request for the target terminal sent by the AMF entity, wherein the location request carries a container containing the terminal location capability of the target terminal; or receive, after a location service session is established, a second indication message sent by the AMF entity, wherein the second indication message carries a container containing the terminal location capability of the target terminal.

14. The method according to claim 8, further comprising:

acquiring the terminal location capability of a target terminal from an access and mobility management function (AMF) entity in a case that the terminal location capability of the target terminal is stored in the AMF entity, and setting a location method for the target terminal according to the terminal location capability.

* * * * *